(12) United States Patent
Ito

(10) Patent No.: US 10,436,349 B2
(45) Date of Patent: Oct. 8, 2019

(54) PRESSURE REDUCTION VALVE

(71) Applicant: DENSO CORPORATION, Kariya, Aichi-pref. (JP)

(72) Inventor: Shigeki Ito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/572,655

(22) PCT Filed: May 30, 2016

(86) PCT No.: PCT/JP2016/065888
§ 371 (c)(1),
(2) Date: Nov. 8, 2017

(87) PCT Pub. No.: WO2016/199610
PCT Pub. Date: Dec. 15, 2016

(65) Prior Publication Data
US 2018/0135775 A1 May 17, 2018

(30) Foreign Application Priority Data
Jun. 9, 2015 (JP) .................................. 2015-116370

(51) Int. Cl.
*F16K 47/02* (2006.01)
*F25B 41/06* (2006.01)
(Continued)

(52) U.S. Cl.
CPC .......... *F16K 47/02* (2013.01); *F16K 31/1266* (2013.01); *F25B 41/06* (2013.01);
(Continued)

(58) Field of Classification Search
CPC ...... F16K 47/02; F16K 31/1266; F25B 41/06; F25B 41/062; F25B 2341/0683; F25B 2500/13; G05D 16/0633; G05D 16/0638
(Continued)

(56) References Cited

U.S. PATENT DOCUMENTS 2,178,444 A * 10/1939 Marsden ................... F01L 1/16
251/337
4,542,852 A * 9/1985 Orth ...................... F25B 41/062
188/381
(Continued)

FOREIGN PATENT DOCUMENTS

JP     2005156046 A      6/2005
JP     2005249300 A  *   9/2005
(Continued)

*Primary Examiner* — William M McCalister
(74) *Attorney, Agent, or Firm* — Harness, Dickey & Pierce, P.L.C.

(57) ABSTRACT

A valve piece urging member urges a valve piece toward a valve closing side, at which an opening degree of a restriction passage is reduced by the valve piece. An actuation member exerts a drive force against the valve piece in a direction of moving the valve piece toward a valve opening side, at which the opening degree of the restriction passage is increased by the valve piece. A vibration limiting member limits vibration of the valve piece in a direction, which intersects with the axial direction, by generating an urging force for urging the valve main body at a location between the valve main body and the valve piece. When the valve piece is moved beyond a predetermined displacement position toward the valve opening side, the valve piece releases the urging force of the vibration limiting member.

9 Claims, 22 Drawing Sheets

(51) Int. Cl.
*F16K 31/126* (2006.01)
*G05D 16/06* (2006.01)

(52) U.S. Cl.
CPC ....... *F25B 41/062* (2013.01); *G05D 16/0633* (2013.01); *G05D 16/0638* (2013.01); *F25B 2341/0683* (2013.01); *F25B 2500/13* (2013.01)

(58) Field of Classification Search
USPC ................................. 251/284, 322, 323, 337
See application file for complete search history.

(56) References Cited

U.S. PATENT DOCUMENTS

| | | | | |
|---|---|---|---|---|
| 6,029,694 | A * | 2/2000 | Schwegler | F02M 37/0029 137/493.6 |
| 6,296,194 | B1 * | 10/2001 | Hirota | F25B 41/062 236/92 B |
| 6,612,503 | B2 * | 9/2003 | Hirota | F25B 41/062 236/92 B |
| 2003/0010834 | A1 * | 1/2003 | Yano | F25B 41/062 236/92 B |
| 2004/0079810 | A1 * | 4/2004 | Kobayashi | F25B 41/062 236/92 B |
| 2004/0177632 | A1 * | 9/2004 | Watari | F25B 41/062 62/222 |
| 2005/0126218 | A1 * | 6/2005 | Sohn | F25B 41/04 62/527 |
| 2005/0252238 | A1 * | 11/2005 | Kobayashi | F16K 31/002 62/527 |
| 2006/0086116 | A1 * | 4/2006 | Robin | F25B 9/008 62/222 |
| 2006/0117774 | A1 * | 6/2006 | Ise | F25B 41/062 62/222 |
| 2007/0209387 | A1 * | 9/2007 | Hirota | F25B 41/062 62/527 |
| 2008/0251742 | A1 * | 10/2008 | Ise | F25B 41/062 251/11 |
| 2010/0163637 | A1 * | 7/2010 | Ikegami | F25B 41/062 236/92 B |
| 2012/0234931 | A1 * | 9/2012 | Hirota | F25B 41/062 236/92 B |
| 2013/0160875 | A1 * | 6/2013 | Schriner | F16K 15/03 137/529 |
| 2013/0206851 | A1 * | 8/2013 | Sekiguchi | F16K 31/04 236/92 B |
| 2013/0247609 | A1 * | 9/2013 | Kaneko | F25B 41/062 62/528 |
| 2013/0283836 | A1 * | 10/2013 | Satake | F25B 41/062 62/225 |
| 2014/0064944 | A1 * | 3/2014 | Li | F16F 1/324 415/182.1 |
| 2014/0261765 | A1 * | 9/2014 | Satake | F25B 41/062 137/340 |
| 2016/0223232 | A1 * | 8/2016 | Ito | F25B 41/062 |
| 2016/0223233 | A1 * | 8/2016 | Ito | F25B 41/062 |

FOREIGN PATENT DOCUMENTS

| | | |
|---|---|---|
| JP | 2013068368 A | 4/2013 |
| JP | 2014173807 A | 9/2014 |

* cited by examiner

PRESSURE REDUCTION VALVE

CROSS REFERENCE TO RELATED APPLICATIONS

This application is a U.S. National Phase Application under 35 U.S.C. 371 of International Application No. PCT/JP2016/065888 filed on May 30, 2016 and published in Japanese as WO 2016/199610 A1 on Dec. 15, 2016. This application is based on and claims the benefit of priority from Japanese Patent Application No. 2015-116370 filed on Jun. 9, 2015. The entire disclosures of all of the above applications are incorporated herein by reference.

TECHNICAL FIELD

The present disclosure relates to a pressure reduction valve that reduces a pressure of pressure fluid.

BACKGROUND ART

For example, a pressure reduction valve recited in the patent literature 1 is this type of pressure reduction valve. The pressure reduction valve of the patent literature 1 includes a valve main body and a valve piece unit. A valve chamber and a restriction passage (e.g., an orifice) communicated with the valve chamber are formed in the valve main body of the pressure reduction valve. In the pressure reduction valve, refrigerant, which serves as pressure fluid, flows from the valve chamber to the restriction passage. In the valve piece unit, when a valve piece is displaced in an axial direction of an axis, an opening degree of the restriction passage is increased or decreased. The valve piece is supported by a valve support and is urged by a compression coil spring in a valve closing direction that is a direction for closing the restriction passage. The valve support includes a valve pressing portion and a plurality of spring arms. The valve pressing portion supports the valve piece. Each of the spring arms extends in a direction that intersects with a valve opening and closing direction along a peripheral wall surface of the valve chamber.

Each spring arm includes a projecting part that projects toward a radially outer side, i.e., toward the peripheral wall surface of the valve chamber. Each spring arm resiliently contacts the peripheral wall surface of the valve chamber through the projection. Therefore, the valve support always contacts the peripheral wall surface of the valve chamber through the projections, and the projections are slid along the peripheral wall surface of the valve chamber in response to the movement of the valve piece.

CITATION LIST

Patent Literature

PATENT LITERATURE 1: JP2013-068368 A

SUMMARY OF INVENTION

In the pressure reduction valve, in which the opening degree of the restriction passage is adjusted with the valve piece, a noise may be generated in a minute opening degree range, in which the restriction passage is opened at an opening degree that is smaller than a predetermined opening degree. A cause of the noise may be as follows. Specifically, a fluid force, which is generated by a flow of the pressure fluid around the valve piece, is applied to the valve piece, and thereby the valve piece is swung in a direction perpendicular to the axial direction of the axis to generate the noise.

In contrast, the pressure reduction valve of the patent literature 1 includes the valve support, so that the swing movement of the valve piece may be suppressed to a certain extent. However, the valve support, which functions as the vibration limiting member that limits vibration (e.g., swing movement) of the valve piece, is always in contact with the peripheral wall surface of the valve chamber through the projections of the valve support. In response to the movement of the valve piece, the projections are slid along the peripheral wall surface of the valve chamber while the projections press the peripheral wall surface of the valve chamber. Therefore, it is conceivable that when the slide movement of the projections of the valve support along the peripheral wall surface of the valve chamber is repeated, the peripheral wall surface, which is a portion of the valve main body, is scraped by the projections and is thereby worn. The above-described matter is found as a result of the detailed study of the inventor of the present application.

The present disclosure is made in view of the above point, and it is an objective of the present disclosure to provide a pressure reduction valve that can limit swing movement of a valve piece in a minute opening degree range of a restriction passage by a vibration limiting member and also limit wearing of a valve main body caused by the limiting of the swing movement of valve piece with the vibration limiting member.

In order to achieve the above objective, according to one aspect of the present disclosure, a pressure reduction valve includes:

a valve main body that has a restriction passage, which conducts pressure fluid and restricts a flow of the pressure fluid;

a valve piece that is displaceable in an axial direction of an axis to increase or decrease an opening degree of the restriction passage;

a valve piece urging member that urges the valve piece toward a valve closing side, at which the opening degree of the restriction passage is reduced by the valve piece;

an actuation member that exerts a drive force against the valve piece in a direction of moving the valve piece toward a valve opening side, at which the opening degree of the restriction passage is increased by the valve piece; and a vibration limiting member that limits vibration of the valve piece in a direction, which intersects with the axial direction, by generating an urging force for urging the valve main body at a location between the valve main body and the valve piece, wherein:

when the valve piece is moved beyond a predetermined displacement position toward the valve opening side, the valve piece releases the urging force of the vibration limiting member.

According to the above disclosure, the vibration limiting member generates the urging force for urging the valve main body at the location between the valve main body and the valve piece, so that the vibration in the direction, which intersects with the axial direction, is limited. Furthermore, when the valve piece is moved beyond the predetermined displacement position toward the valve opening side, the urging force of the vibration limiting member is released. Thus, the vibration of the valve piece can be limited by the vibration limiting member in a minute opening degree range of the restriction passage, in which the valve piece is not displaced beyond the predetermined displacement position toward the valve opening side. In contrast, when the opening degree of the restriction passage is increased beyond the minute opening degree range of the restriction passage, the urging force of the vibration limiting member is no longer required. In such a case, the urging force of the vibration limiting member is released. Therefore, even in the case where the urging force of the vibration limiting member is likely to generate wearing at the valve main body, the wearing of the valve main body can be limited by releasing the urging force.

DESCRIPTION OF EMBODIMENTS

Figure 1:
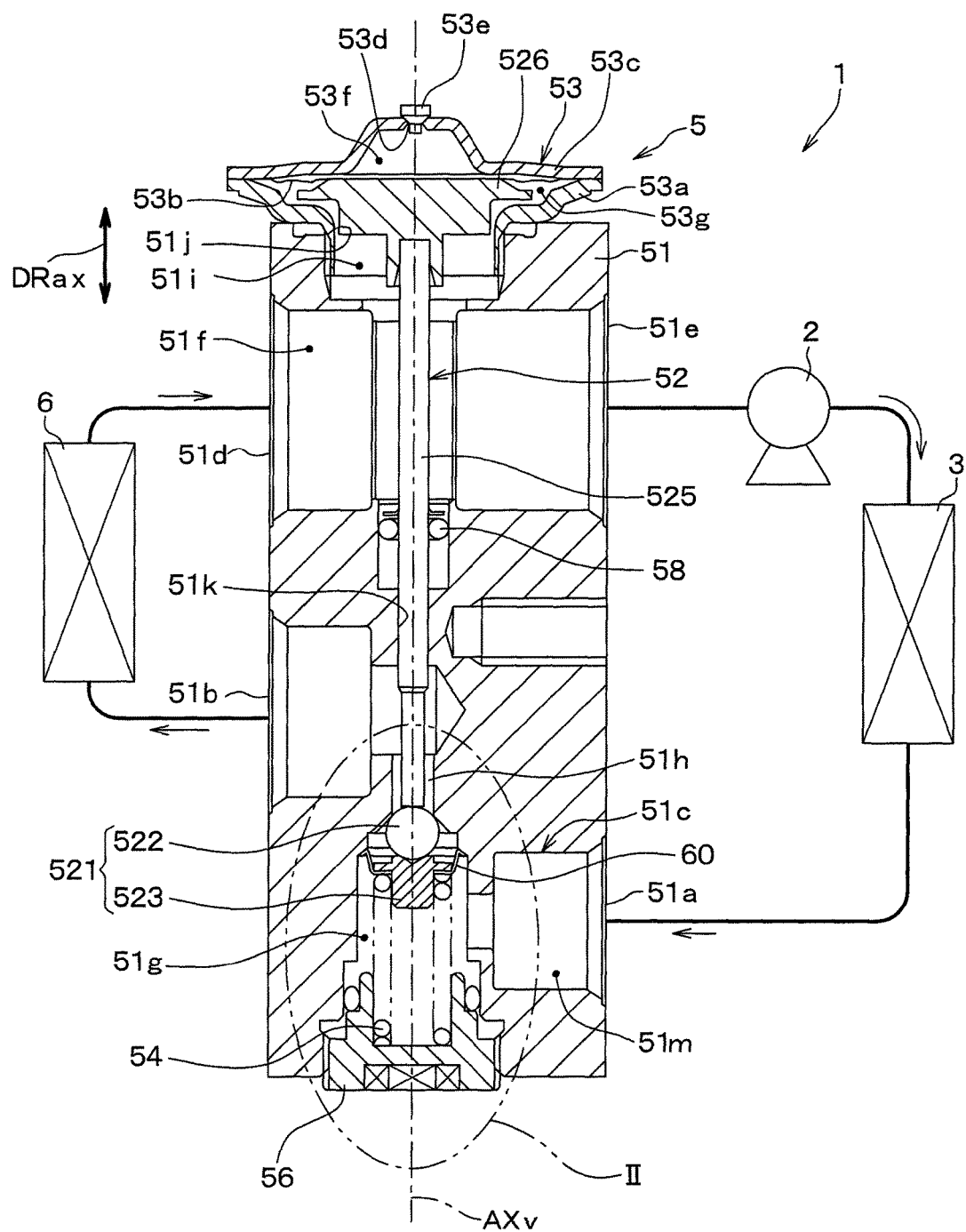
FIG. 1 is a cross-sectional view of a thermal expansion valve, which is a pressure reduction valve, according to a first embodiment.

Various embodiments of the present disclosure will be described with reference to the accompanying drawings. In each of the following embodiments, the same or similar components are indicated by the same reference numerals in the drawing(s).

First Embodiment

FIG. 1 is a cross-sectional view of a thermal expansion valve 5, which is a pressure reduction valve, according to the present embodiment. In the present embodiment, a vapor compression refrigeration cycle 1, in which the thermal expansion valve 5 is installed, is used in a vehicle air conditioning system. In FIG. 1, a connection relationship between the thermal expansion valve 5 and the respective constituent devices of the vapor compression refrigeration cycle 1 is also schematically indicated.

The vapor compression refrigeration cycle 1 uses a fluorocarbon refrigerant (e.g., R134a) as the refrigerant and forms a subcritical cycle, in which a pressure of the high pressure refrigerant does not exceed a critical pressure of the refrigerant. A compressor 2 of the vapor compression refrigeration cycle 1 shown in FIG. 1 receives a drive force of an undepicted vehicle drive engine through, for example, an electromagnetic clutch, to draw and compress the refrigerant.

A radiator 3 is a heat radiating heat exchanger that releases the heat from the high pressure refrigerant by exchanging the heat between the high pressure refrigerant, which is discharged from the compressor 2, and an external air (an external air at outside of a cabin of the vehicle), which is blown by an undepicted cooling fan, to condense the refrigerant. The thermal expansion valve 5 is connected to an outlet of the radiator 3. An undepicted liquid receiver, which serves as a receiver, is installed between the outlet of the radiator 3 and the thermal expansion valve 5. Alternatively, an inlet of the liquid receiver may be connected to the outlet of the radiator 3, and the outlet of the liquid receiver may be connected to the thermal expansion valve 5. The liquid receiver separates the refrigerant outputted from the radiator 3 into a gas phase refrigerant and a liquid phase refrigerant and accumulates the excessive liquid phase refrigerant of the cycle.

The thermal expansion valve 5 is a pressure reduction valve that reduces a pressure of the refrigerant, which serves as pressure fluid. Specifically, the thermal expansion valve 5 depressurizes and expands the high pressure refrigerant, which is outputted from the radiator 3. The thermal expansion valve 5 changes a passage cross-sectional area (in other words, a valve opening degree) of a restriction passage in response to a temperature and a pressure of the refrigerant, which is outputted from the evaporator 6, in such a manner that a degree of superheat of the refrigerant, which is outputted from the evaporator 6, approaches a predetermined value, and thereby a flow quantity of the refrigerant, which is outputted to an inlet of the evaporator 6, is adjusted. Details of the thermal expansion valve 5 will be described later.

The evaporator 6 is a heat absorbing heat exchanger that exchanges the heat between the low pressure refrigerant, which is depressurized and expanded through the thermal expansion valve 5, and the air, which is blown by an undepicted blower, so that the low pressure refrigerant is evaporated to absorb the heat. Furthermore, the outlet of the evaporator 6 is connected to a suction inlet of the compressor 2 through a second refrigerant passage 51f, which is formed in an inside of the thermal expansion valve 5.

Next, the structure of the thermal expansion valve 5 will be described in detail. The thermal expansion valve 5 is of an external pressure equalizing type and includes a body (serving as a valve main body) 51, a valve unit 52, an element assembly 53 and a coil spring 54, as shown in FIG. 1.

The body 51 of the thermal expansion valve 5 forms, for example, an outer shell of the thermal expansion valve 5 and refrigerant passages in the inside of the thermal expansion valve 5. The body 51 is formed by applying a hole forming process to a metal block, which is configured into a cylindrical tubular form or a polygonal tubular form. A first flow inlet 51a, a first flow outlet 51b, a first refrigerant passage 51c, a second flow inlet 51d, a second flow outlet 51e, a second refrigerant passage 51f, a communication chamber 51i, an installation hole 51j and an actuation rod receiving hole 51k are formed in the body 51.

The first refrigerant passage 51c is a refrigerant passage, which extends from the first flow inlet 51a to the first flow outlet 51b. The first flow inlet 51a is connected to a refrigerant outlet of the radiator 3 such that the high pressure refrigerant, which is outputted from the radiator 3, is inputted to the first refrigerant passage 51c through the first flow inlet 51a. The first flow outlet 51b is connected to the refrigerant inlet of the evaporator 6 such that the refrigerant in the first refrigerant passage 51c is outputted to the evaporator 6 through the first flow outlet 51b.

The second refrigerant passage 51f is a refrigerant passage, which extends from the second flow inlet 51d to the second flow outlet 51e. The second flow inlet 51d is connected to the refrigerant outlet of the evaporator 6 such that the low pressure refrigerant, which is outputted from the evaporator 6, is inputted to the second refrigerant passage 51f through the second flow inlet 51d. The second flow outlet 51e is connected to the suction inlet of the compressor 2 such that the refrigerant in the second refrigerant passage 51f is outputted to the compressor 2 through the second flow outlet 51e.

Figure 2:
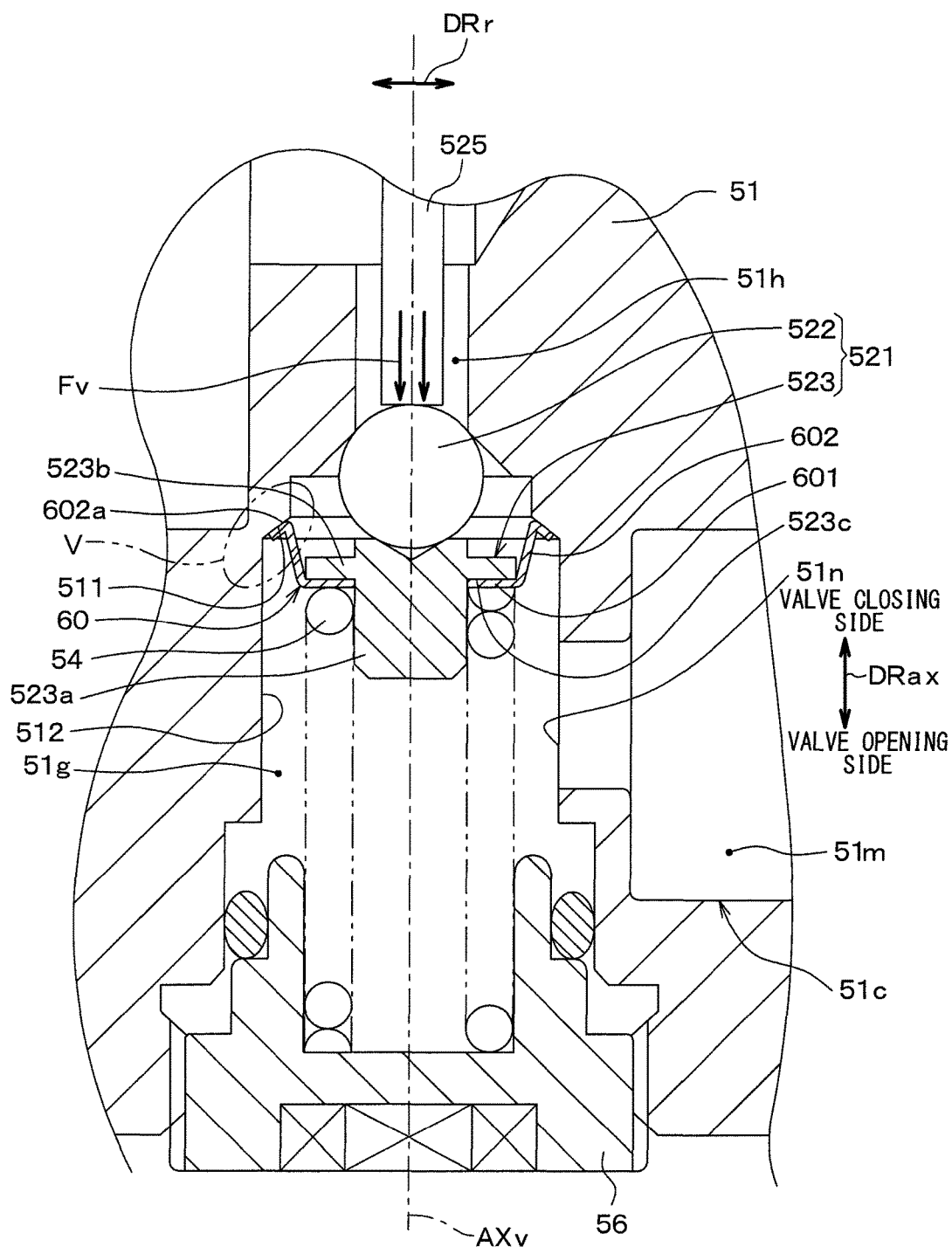
FIG. 2 is an enlarged view showing a valve chamber and a restriction passage of the thermal expansion valve of the first embodiment, i.e., an enlarged view of a portion II in FIG. 1.

The first refrigerant passage 51c includes a valve chamber 51g and a restriction passage 51h as a portion of the first refrigerant passage 51c. FIG. 2 is an enlarged view showing the valve chamber 51g and the restriction passage 51h of the thermal expansion valve 5, i.e., an enlarged view of a portion II in FIG. 1. In FIGS. 1 and 2, the thermal expansion valve 5 is in a state of a valve closing time where a ball valve portion 522 closes the restriction passage 51h.

As shown in FIGS. 1 and 2, the valve chamber 51g is a space that receives a valve piece 521, a damper spring 60 and a coil spring 54. Since the valve chamber 51g forms the portion of the first refrigerant passage 51c, the valve chamber 51g is communicated with the restriction passage 51h. The valve chamber 51g is located on an upstream side of the restriction passage 51h. That is, the first flow inlet 51a, the valve chamber 51g, the restriction passage 51h, and the first flow outlet 51*b* are connected and arranged one after another in this order from the upstream side in the flow direction of the refrigerant in the first refrigerant passage 51*c*.

Specifically, the valve chamber 51*g* is a cylindrical space that is coaxial with the restriction passage 51*h*. The body 51 includes a spring contact surface 511 and a valve chamber peripheral wall surface 512. The spring contact surface 511 serves as a contact portion, which is exposed in the valve chamber 51*g* and contacts the damper spring 60. The valve chamber peripheral wall surface 512 surrounds the valve chamber 51*g* around a valve axis AXv. The spring contact surface 511 is a contact surface, which is exposed in the valve chamber 51*g* and is contactable with the damper spring 60. The spring contact surface 511 is in a form of a ring surface that is continuous in a circumferential direction all around the valve axis AXv. Specifically, the spring contact surface 511 is in a tapered form that circumferentially extends about the valve axis AXv. The tapered form of the spring contact surface 511 is configured such that an inner diameter of the spring contact surface 511 progressively increases toward a side, which is away from the restriction passage 51*h*, i.e., toward a valve opening side of the valve piece 521 in a valve axial direction DRax. That is, the spring contact surface 511 is formed by a tapered surface that faces obliquely inward in a radial direction DRr of the valve axis AXv.

The valve chamber peripheral wall surface 512 is, for example, in a form of an inner surface of a cylinder and is located on an opposite side of the spring contact surface 511, which is opposite from the restriction passage 51*h* in the valve axial direction DRax. Furthermore, an inlet communication passage 51*m*, which is included in the first refrigerant passage 51*c* and connects between the valve chamber 51*g* and the first flow inlet 51*a*, is connected to the valve chamber 51*g*. Therefore, a communication opening 51*n*, which is a connection end of the inlet communication passage 51*m*, is formed in a portion of the valve chamber peripheral wall surface 512.

The restriction passage 51*h* is a refrigerant passage that conducts the refrigerant supplied from the valve chamber 51*g* and restricts the flow of the refrigerant. Specifically, the restriction passage 51*h* is a refrigerant passage that conducts the refrigerant from the valve chamber 51*g*, which in turn receives the refrigerant from the first flow inlet 51*a*, to the first flow outlet 51*b* side while depressurizing and expanding the refrigerant.

The communication chamber 51*i* is a space that is communicated with the second refrigerant passage 51*f* and an installation hole 51*j* formed in an upper surface of the body 51. The element assembly 53, which will be described later, is installed from the outside of the body 51 into the installation hole 51*j*.

The valve unit 52 includes a valve piece 521, a temperature sensitive actuation rod 525, and a stopper 526. The valve piece 521 is installed to one end portion of the valve unit 52. The temperature sensitive actuation rod 525 serves as an actuation member that conducts the heat of the refrigerant in the second refrigerant passage 51*f* and contacts the valve piece 521 to drive the valve piece 521. The stopper 526 is placed between the temperature sensitive actuation rod 525 and a diaphragm 53*b* of the element assembly 53.

The valve piece 521 includes a ball valve portion 522 and a ball valve support portion 523. The ball valve portion 522 is shaped into a spherical form. The ball valve support portion 523 is integrally fixed to the ball valve portion 522 by, for example, welding or bonding. The valve piece 521 is displaceable in the axial direction DRax of the axis AXv of the valve piece 521 that extends in the longitudinal direction of the body 51 to increase or decrease an opening degree of the restriction passage 51*h*. In other words, when the valve piece 521 is moved in the axial direction DRax of the axis AXv of the valve piece 521, a size of a refrigerant passage cross-sectional area of the restriction passage 51*h* is adjusted. When the size of the refrigerant passage cross-sectional area is increased, the opening degree of the restriction passage 51*h* is increased. The axis AXv is also an axis of the temperature sensitive actuation rod 525. In the following description, the axis AXv is also referred to as the valve axis AXv, and the axial direction DRax of the axis AXv is also referred to as the valve axial direction DRax.

A coil spring 54, which is compressed in the valve axial direction DRax, is received in the valve chamber 51*g* and functions as a valve piece urging member that urges the valve piece 521. Specifically, the coil spring 54 is placed on an opposite side of the valve piece 521, which is opposite from the restriction passage 51*h* in the valve axial direction DRax. One end of the coil spring 54 in the valve axial direction DRax contacts the ball valve support portion 523, and the other end of the coil spring 54 in the valve axial direction DRax contacts an adjusting screw 56. With this arrangement, the coil spring 54 urges the valve piece 521 toward a valve closing side, at which the opening degree of the restriction passage 51*h* is reduced by the valve piece 521.

Specifically, the ball valve support portion 523 includes a shaft part 523*a* and a flange part 523*b*. The shaft part 523*a* is joined to the ball valve portion 522. The flange part 523*b* projects in a form of a flange from the shaft part 523*a* in a radial direction of the valve axis AXv. The flange part 523*b* includes a ring surface 523*c*. The ring surface 523*c* faces an opposite side, which is opposite from the restriction passage 51*h* in the valve axial direction DRax, while the ring surface 523*c* is shaped into a ring form that extends around the valve axis AXv. The ball valve support portion 523 receives an urging force of the coil spring 54 through the ring surface 523*c*, and the coil spring 54 urges the ring surface 523*c* of the ball valve support portion 523 toward the restriction passage 51*h* in the valve axial direction DRax. The adjusting screw 56 is a screw member that is threadably engaged with the body 51 to close a portion of the valve chamber 51*g*. The urging force of the coil spring 54, which urges the valve piece 521, is adjustable with the adjusting screw 56.

The temperature sensitive actuation rod 525 is shaped into a generally cylindrical column form. One end of the temperature sensitive actuation rod 525 abuts against the ball valve portion 522 of the valve piece 521, and the other end of the temperature sensitive actuation rod 525 is fitted into the stopper 526 and abuts against the stopper 526. Thus, the displacement of the diaphragm 53*b* in the valve axial direction DRax is conducted to the temperature sensitive actuation rod 525 through the stopper 526, and the temperature sensitive actuation rod 525 urges the valve piece 521 in the valve axial direction DRax in response to the displacement of the diaphragm 53*b*. That is, the temperature sensitive actuation rod 525 exerts a drive force Fv that drives the valve piece 521 toward a valve opening side, at which the opening degree of the restriction passage 51*h* is increased by the valve piece 521, against the ball valve portion 522 of the valve piece 521.

Furthermore, the temperature sensitive actuation rod 525 extends in the valve axial direction DRax through the second refrigerant passage 51*f*, which extends in the radial direction DRr (see FIG. 2) of the valve axis AXv. That is, the temperature sensitive actuation rod 525 is placed such that an outer peripheral surface of the temperature sensitive actuation rod 525 is exposed to the refrigerant in the second refrigerant passage 51f and the refrigerant in the communication chamber 51i. In this way, the temperature sensitive actuation rod 525 can conduct the temperature of the refrigerant, which flows in the second refrigerant passage 51f, to the element assembly 53.

Furthermore, the temperature sensitive actuation rod 525 extends through the actuation rod receiving hole 51k and the restriction passage 51h, which extend along the valve axis AXv through a portion of the body 51 between the first refrigerant passage 51c and the second refrigerant passage 51f. The temperature sensitive actuation rod 525 forms a radial gap between temperature sensitive actuation rod 525 and a passage wall surface of the restriction passage 51h such that the refrigerant flows through the radial gap. An O-ring 58, which serves as a seal member, is installed to limit a flow of the refrigerant between the first refrigerant passage 51c and the second refrigerant passage 51f through the gap, which is formed between the actuation rod receiving hole 51k and the temperature sensitive actuation rod 525 of the valve unit 52.

Figure 3:
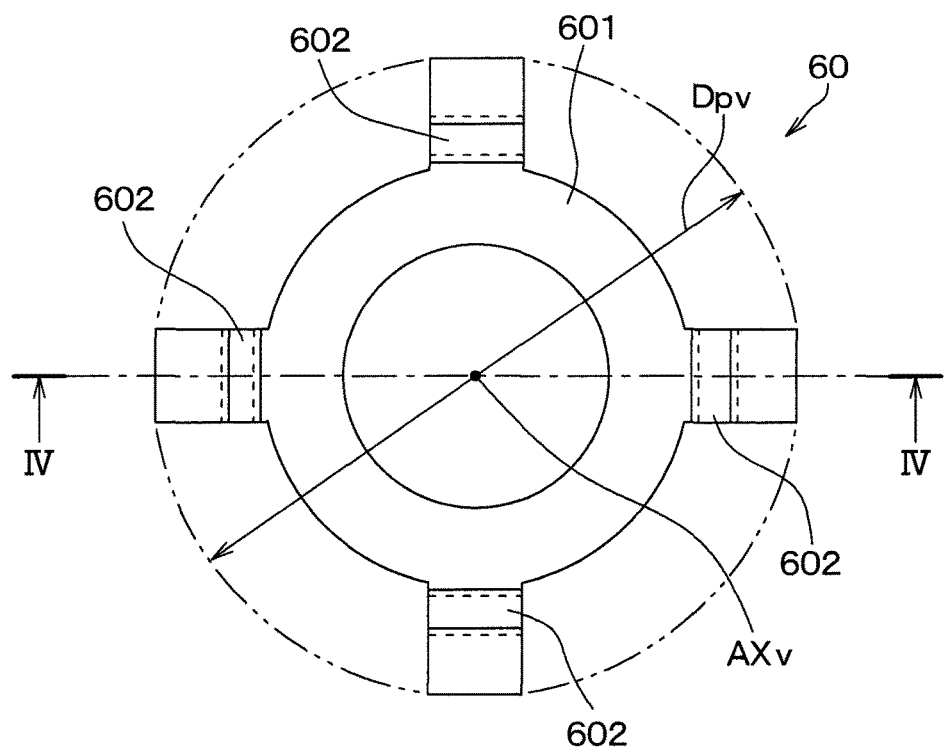
FIG. 3 is a view of a damper spring of FIG. 2 alone viewed from the restriction passage side along a valve axis.
Figure 4:
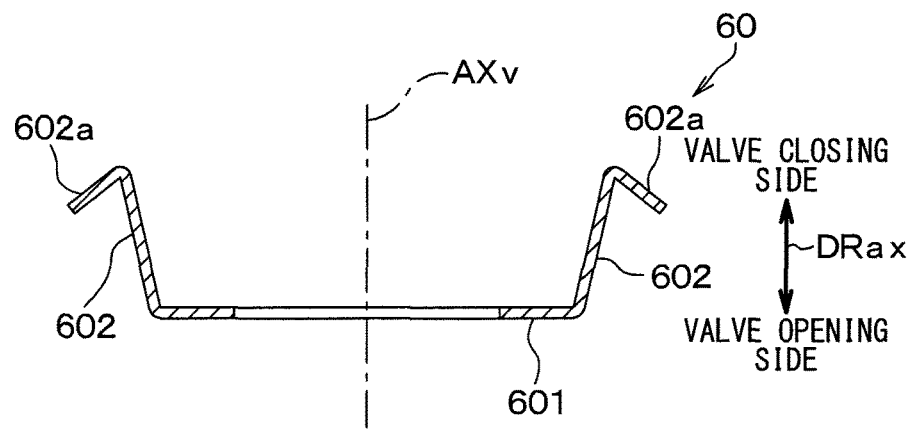
FIG. 4 is a cross-sectional view taken along line IV-IV in FIG. 3.

The damper spring 60 is a vibration limiting member that limits vibration of the valve piece 521 in a direction, which intersects with the valve axial direction DRax. Specifically, the damper spring 60 is made of metal and is formed through stamping of a thin leaf spring material. FIG. 3 is a view of the damper spring 60 alone viewed from the restriction passage 51h side along the valve axis Axv. FIG. 4 is a cross-sectional view taken along line IV-IV in FIG. 3. The radial direction DRr of the valve axis AXv is an example of the direction that intersects with the valve axial direction DRax. Here, it should be noted that the direction, which intersects with the valve axial direction DRax, may include another direction(s) that is other than the radial direction DRr of the valve axis AXv.

As shown in FIGS. 3 and 4, the damper spring 60 includes a clampable portion 601 and a plurality of extending portions 602. A thickness direction of the clampable portion 601 is the valve axial direction DRax. The clampable portion 601 is shaped into a circular ring form that is continuous in the circumferential direction all around the valve axis AXv. As shown in FIG. 2, the clampable portion 601 of the damper spring 60 is clamped between the ring surface 523c of the ball valve support portion 523 and the coil spring 54. A clamping force between the ring surface 523c and the coil spring 54, i.e., the urging force of the coil spring 54 is sufficient to hold the clampable portion 601 together with the flange part 523b of the ball valve support portion 523. That is, the damper spring 60 is fixed to the valve piece 521 with the urging force of the coil spring 54. Thus, when the valve piece 521 is moved in the valve axial direction DRax, the damper spring 60 is moved integrally with the valve piece 521.

Furthermore, as shown in FIGS. 3 and 4, the number of the extending portions 602 of the damper spring 60 is four, and the extending portions 602 extend obliquely and radially from the clampable portion 601 about the valve axis AXv. Specifically, each extending portion 602 extends from a base end part of the extending portion 602, which is joined to the clampable portion 601, to a distal end part of the extending portion 602 toward a radially outer side in the radial direction DRr of the valve axis AXv and also toward the restriction passage 51h side in the valve axial direction DRax.

The damper spring 60 is contactable with the spring contact surface 511 (see FIG. 2) of the body 51 through a fraction of each of the extending portions 602. Specifically, the distal end part of each of the extending portions 602 has a distal end surface 602a, which serves as a limiting member side contact surface that extends along the spring contact surface 511, and the distal end surfaces 602a of the extending portions 602 is contactable with the spring contact surface 511. It is understood that the distal end surface 602a is included in the extending portion 602.

Figure 5A:
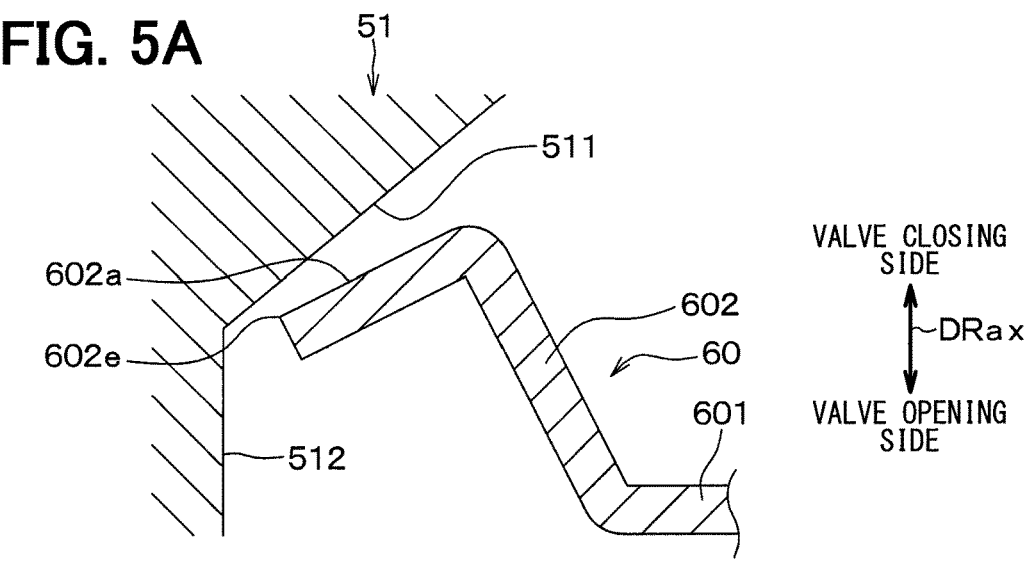
FIG. 5A is an enlarged view of a portion V in FIG. 2, showing a state where a distal end surface of the damper spring is spaced from a spring contact surface of a body.

Specifically, as shown in FIG. 5A, in a free state of the damper spring 60 where the distal end surfaces 602a are spaced from the spring contact surface 511, the distal end surfaces 602a are not parallel with the spring contact surface 511. Specifically, in the free state of the damper spring 60, each distal end surface 602a is tilted such that a gap between the distal end surface 602a and the spring contact surface 511 measured in the valve axial direction DRax is progressively increased toward the radially inner side in the radial direction DRr.

Figure 5B:
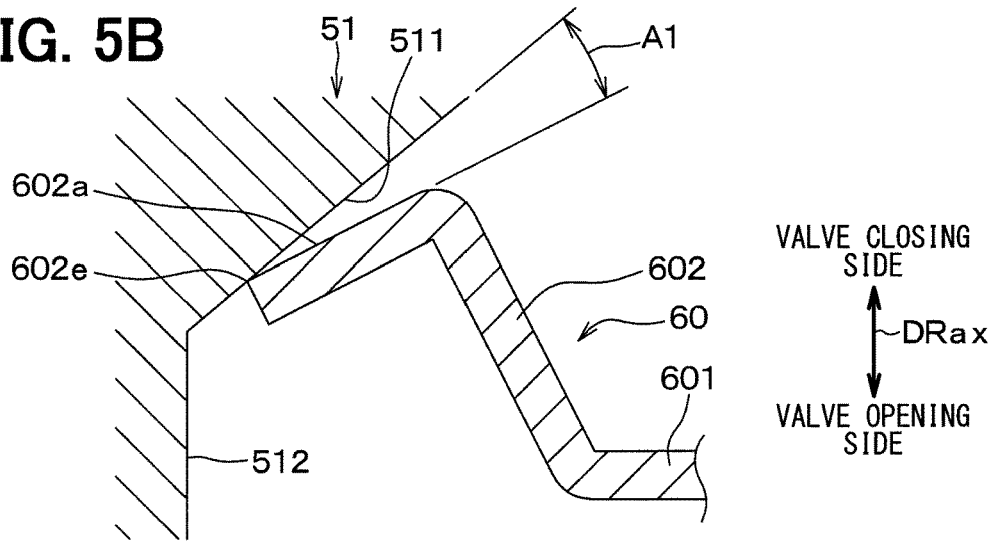
FIG. 5B is a view of the same portion as that of FIG. 5A, showing a state where the distal end surface of the damper spring begins to contact the spring contact surface of the body.

Thus, as shown in FIG. 5B, when the distal end surface 602a of the damper spring 60 contacts the spring contact surface 511 of the body 51 in response to the displacement of the valve piece 521 toward the valve closing side, the contact of the distal end surface 602a with the spring contact surface 511 begins from a radially outer part of the distal end surface 602a, which is located at a radially outer side in the radial direction DRr of the valve axis AXv. That is, a radially outer end 602e of the distal end surface 602a, which is a radially outermost part of the distal end surface 602a in the radial direction DRr of the valve axis AXv, initially contacts the spring contact surface 511.

Figure 5C:
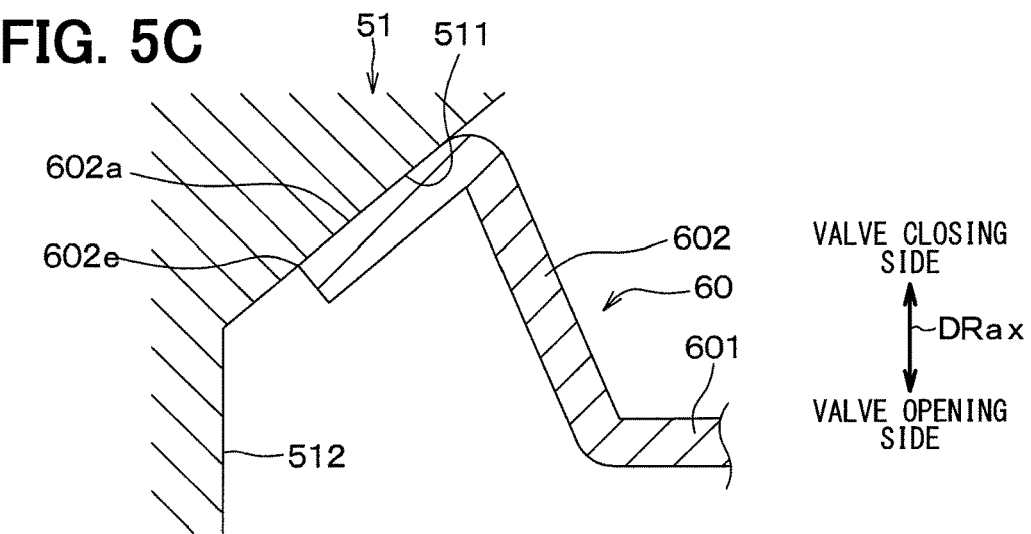
FIG. 5C is a view of the same portion as that of FIG. 5A, showing a state of the damper spring that is in a valve closing state where the valve piece closes the restriction passage after movement of the valve piece from the state shown in FIG. 5B toward a valve closing side.

Then, as shown in FIG. 5B, after the start of the contact of the distal end surface 602a of the damper spring 60, the damper spring 60 is flexed in a manner shown in FIG. 5C at a stroke end of the valve piece 521 at the valve closing side. That is, after the start of the contact of the distal end surface 602a to the spring contact surface 511, the damper spring 60 is flexed such that when the valve piece 521 is moved toward the valve closing side, a tilt angle A1 (in other words, a contact surface angle A1) of the distal end surface 602a relative to the spring contact surface 511 of the body 51 is progressively reduced.

The tilt angle A1 of the distal end surface 602a relative to the spring contact surface 511 in the free state of the damper spring 60 is experimentally determined in view of a corresponding axial moving range of the valve piece 521, in which the noise of the thermal expansion valve 5 is likely generated. A predetermined displacement position of the valve piece 521, which will be described later, is determined according to this tilt angle A1.

Furthermore, in FIGS. 5A-5C, only the body 51 and the damper spring 60 are depicted to ease the understanding of the drawings. This is also true for FIGS. 11A-11C and FIGS. 16A-16C described later.

As discussed above, the damper spring 60 proceeds to contact the body 51 in a manner shown in FIGS. 2 and 5A-5C. At this time, the damper spring 60 is resiliently deformed by the urging force of the coil spring 54, so that the distal end surfaces 602a of the damper spring 60 are urged against the spring contact surface 511 of the body 51. When the distal end surfaces 602a of the damper spring 60 are urged against the spring contact surface 511, the damper spring 60 generates an urging force Fp (see FIG. 6) for urging the body 51 at a location between the body 51 and the valve piece 521. Here, the expression of "between the body 51 and the valve piece 521" refers to "between the body 51 and the valve piece 521 in the transmission path of the force."

Figure 6:
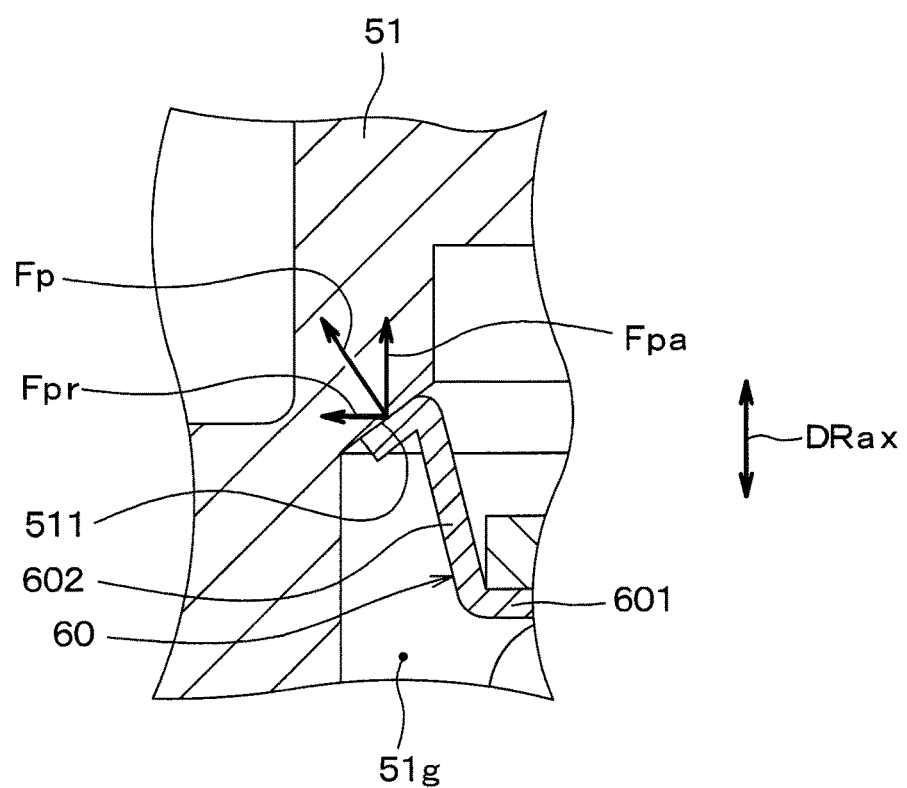
FIG. 6 is an enlarged view of the portion V in FIG. 2.

The urging force Fp of the damper spring 60 is applied to the spring contact surface 511 in a direction that is normal to the spring contact surface 511, which is tapered. Therefore, in a case where one side and the other side in the radial direction DRr of the valve axis AXv are respectively viewed, the urging force Fp of the damper spring 60 becomes a force that is tilted relative to the valve axial direction DRax, as shown in FIG. 6 that is an enlarged view of a portion V in FIG. 2. Thus, the urging force Fp of the damper spring 60 includes a force component Fpa, which is directed in the valve axial direction DRax, and a force component Fpr, which is directed in the radial direction DRr (see FIG. 2) of the valve axis AXv. The urging force Fp is a force that is exerted from the extending portion 602 of the damper spring 60 to the body 51, as shown in FIG. 6.

Figure 7:
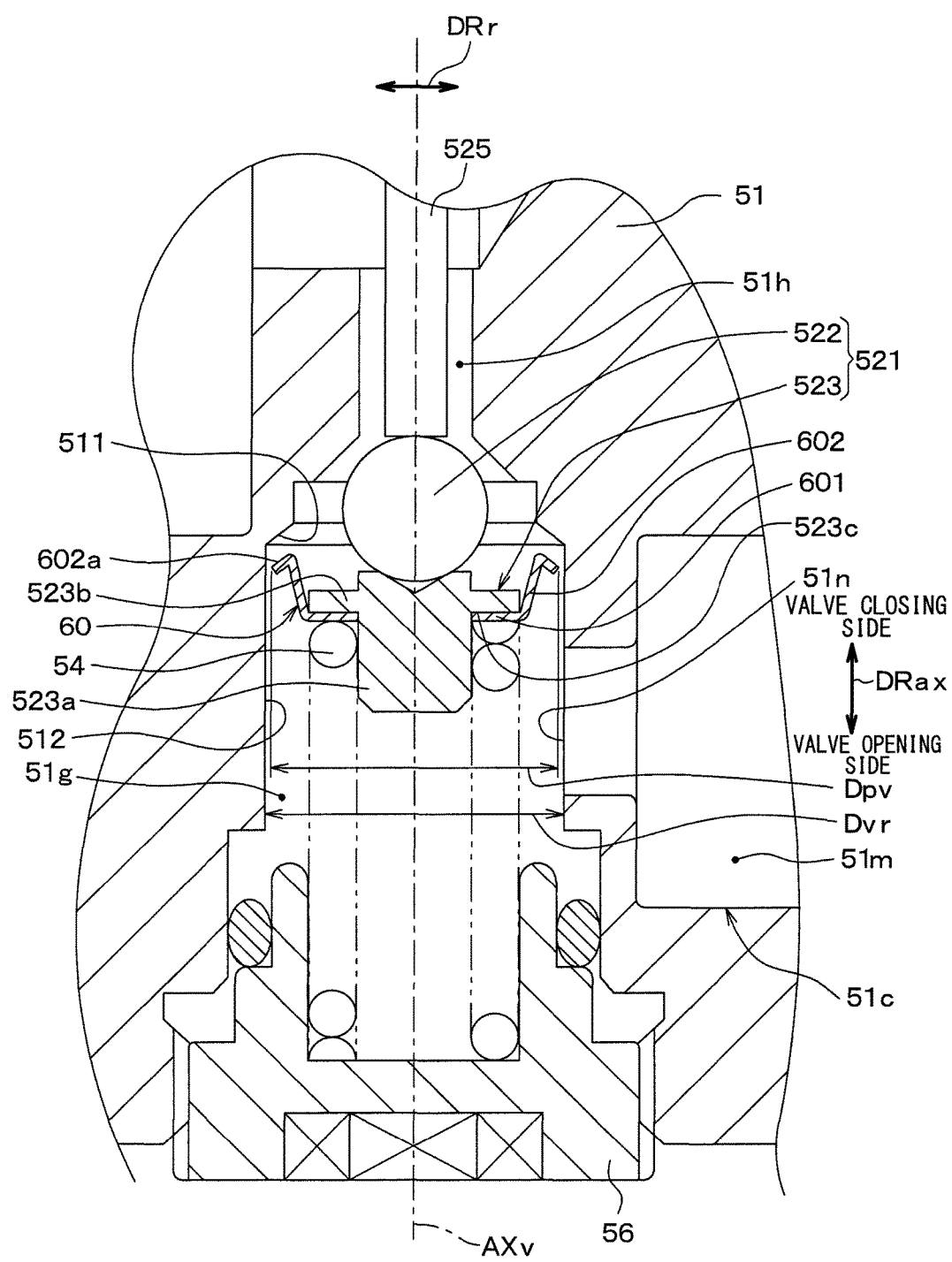
FIG. 7 is a cross-sectional view of the same portion as that of FIG. 2, showing a state where the valve piece is moved beyond a predetermined displacement position toward a valve opening side in the first embodiment.

For example, as understood from FIG. 2, at the valve closing time of the valve piece 521, the resilient deformation of the damper spring 60 is maximized. Therefore, the urging force Fp of the damper spring 60 is maximized at the valve closing time, and the urging force Fp of the damper spring 60 is reduced when the valve piece 521 is moved toward the valve opening side. When the valve piece 521 is moved beyond the predetermined displacement position toward the valve opening side, the damper spring 60 is spaced away from the spring contact surface 511 of the body 51. Thereby, the urging force Fp of the damper spring 60 is released. FIG. 7 shows a state where the damper spring 60 is spaced from the spring contact surface 511 of the body 51. FIG. 7 is a cross-sectional view of the same portion as that of FIG. 2, showing the state where the valve piece 521 is moved beyond the predetermined displacement position toward the valve opening side.

Referring back to FIG. 2, in the case where the urging force Fp (see FIG. 6) of the damper spring 60 is generated, the radial vibration of the valve piece 521 is limited by the frictional force between the spring contact surface 511 of the body 51 and the distal end surface 602a of the damper spring 60 and the frictional force between the clampable portion 601 of the damper spring 60 and the ring surface 523c of the ball valve support portion 523. In other words, the damper spring 60 limits the radial vibration of the valve piece 521 by generating the urging force Fp (see FIG. 6), which urges the body 51. The radial vibration of the valve piece 521 is a vibration (e.g., swing movement) of the valve piece 521 in the radial direction DRr of the valve axis AXv.

The urging force Fp of the damper spring 60 has the force component Fpr (see FIG. 6), which is directed in the radial direction DRr of the valve axis AXv. Therefore, this force component Fpr also contributes to the limiting of the radial vibration of the valve piece 521. In addition to the function of limiting the radial vibration of the valve piece 521, the urging force Fp of the damper spring 60 may have a function of limiting an axial vibration of the valve piece 521, which is a vibration of the valve piece 521 in the valve axial direction DRax, or the urging force Fp of the damper spring 60 may not have this function.

Also, as shown in FIGS. 2 and 7, even when the valve piece 521 is moved to any position in the valve axial direction DRax in the inside of the valve chamber 51g, the outer diameter Dpv of the damper spring 60 is kept to be smaller than the inner diameter Dvr of the valve chamber peripheral wall surface 512. Furthermore, even when the valve piece 521 is moved to any position in the valve axial direction DRax, the damper spring 60 is kept spaced away from the valve chamber peripheral wall surface 512. In other words, in a view taken in the valve axial direction DRax, an entire projected shape of the damper spring 60, which is projected in the valve axial direction DRax, is placed on the radially inner side of the valve chamber peripheral wall surface 512 while a space is interposed therebetween.

In other words, the inner diameter Dvr of the valve chamber peripheral wall surface 512 is an inner diameter of the valve chamber 51g, which has a circular cross section that is perpendicular to the valve axis AXv. Furthermore, as shown in FIG. 3, the outer diameter Dpv of the damper spring 60 is a diameter of a circumscribed circle that is centered at the valve axis AXv and circumscribes the damper spring 60, as shown in FIG. 3.

As shown in FIG. 1, the element assembly 53 includes: an element housing 53a, which is installed to the installation hole 51j by, for example, screwing; a diaphragm 53b, which is a pressure-responsive member; and an element cover 53c, which forms a portion of an outer shell of the element assembly 53. The element housing 53a and the element cover 53c clamp an outer peripheral edge part of the diaphragm 53b therebetween and form the outer shell of the element assembly 53.

The element housing 53a and the element cover 53c are made of metal, such as stainless steel (e.g., SUS 304) and are respectively shaped into a cup form. In the state where the outer peripheral edge part of the diaphragm 53b is clamped between the element housing 53a and the element cover 53c, an outer peripheral end part of the element housing 53a and an outer peripheral end part of the element cover 53c are integrally joined together by, for example, welding or brazing. Therefore, an inner space of the element assembly 53, which is formed by the element housing 53a and the element cover 53c, is partitioned into two spaces by the diaphragm 53b.

One of these two spaces is formed by the element cover 53c and the diaphragm 53b and serves as a sealed space 53f, in which temperature sensitive medium is sealed. The pressure of the temperature sensitive medium changes in response to the temperature of the refrigerant in the second refrigerant passage 51f.

The space, which is formed by the element housing 53a and the diaphragm 53b, is an introducing space 53g, which is communicated with the communication chamber 51i and receives the refrigerant outputted from the evaporator 6 through the communication chamber 51i. Therefore, the temperature sensitive medium, which is sealed in the sealed space 53f, not only receives the temperature of the refrigerant conducted through the second refrigerant passage 51f but also the temperature of the refrigerant introduced into the introducing space 53g through the diaphragm 53b.

In this way, the internal pressure of the sealed space 53f becomes a pressure that corresponds to the temperature of the refrigerant, which is conducted through the second refrigerant passage 51f. The diaphragm 53b is displaced in response to a pressure difference between the internal pressure of the sealed space 53f and the pressure of the refrigerant introduced into the introducing space 53g. Therefore, it is preferred that the diaphragm 53b is made of a strong material that is highly resilient and has high heat conductivity. For example, the diaphragm 53b may be formed from a metal thin plate that is made of, for example, stainless steel (e.g., SUS 304).

Furthermore, as shown in FIG. 1, the element cover 53c has a filling hole 53d, through which the temperature sensitive medium is filled into the sealed space. The filling hole 53d is closed with a sealing plug 53e after the temperature sensitive medium is filled into the sealed space. Furthermore, the temperature sensitive medium, which has the same composition as that of the refrigerant circulated in the vapor compression refrigeration cycle 1, is sealed in the sealed space 53f of the present embodiment in such a manner that the temperature sensitive medium has a predetermined density in the sealed space 53f. Therefore, the temperature sensitive medium of the present embodiment is R134a.

Next, the operation of the present embodiment having the above-described structure will be described. When the compressor 2 is rotated by the rotational drive force of the vehicle drive engine, the refrigerant, which is discharged from the compressor 2 and has the high temperature and the high pressure, is supplied to the radiator 3, at which the refrigerant exchanges the heat with the external air blown by a cooling fan, so that the refrigerant releases the heat and is thereby condensed.

The high pressure refrigerant, which is outputted from the radiator 3, flows into the inlet communication passage 51m through the first flow inlet 51a of the thermal expansion valve 5 and is then supplied from the inlet communication passage 51m to the valve chamber 51g, and the high pressure refrigerant is then depressurized and expanded at the restriction passage 51h. At this time, the refrigerant passage cross-sectional area of the restriction passage 51h is adjusted such that a degree of superheat of the evaporator effluent refrigerant, which is outputted from the evaporator 6, approaches a predetermined value.

The low pressure refrigerant, which is depressurized and is expanded at the restriction passage 51h, is outputted from the first flow outlet 51b and is supplied to the evaporator 6. The refrigerant, which flows into the evaporator 6, absorbs the heat from the air, which is blown by a blower fan, so that the refrigerant is evaporated. Furthermore, the refrigerant, which is outputted from the evaporator 6, flows into the second refrigerant passage 51f through the second flow inlet 51d of the thermal expansion valve 5.

Here, when the degree of superheat of the evaporator effluent refrigerant, which is supplied from the second flow inlet 51d into the communication chamber 51i, is increased, the saturation pressure of the temperature sensitive medium, which is sealed in the sealed space 53f, is increased. Thus, a pressure difference, which is obtained by subtracting the pressure of the introducing space 53g from the internal pressure of the sealed space 53f, is increased. Thereby, the diaphragm 53b is displaced toward the valve opening side (specifically, the downward side in FIG. 1) to drive the valve unit 52 toward the valve opening side and thereby to open the restriction passage 51h.

In contrast, when the degree of superheat of the evaporator effluent refrigerant, which flows in the second refrigerant passage 51f, is reduced, the saturation pressure of the temperature sensitive medium sealed in the sealed space 53f is reduced. Thus, the pressure difference, which is obtained by subtracting the pressure of the introducing space 53g from the internal pressure of the sealed space 53f, is decreased. Thereby, the diaphragm 53b is displaced toward the valve closing side (specifically, the upward side in FIG. 1) to drive the valve unit 52 toward the valve closing side and thereby to close the restriction passage 51h.

As discussed above, the passage cross sectional area of the restriction passage 51h is adjusted such that the degree of superheat of the evaporator effluent refrigerant approaches the predetermined value by displacing the valve unit 52 through the element assembly 53 (more specifically, the diaphragm 53b) according to the degree of superheat of the evaporator effluent refrigerant. Furthermore, the predetermined value of the degree of superheat can be changed by changing the valve opening pressure of the valve piece 521 through adjustment of the load applied from the coil spring 54 to the valve piece 521 through use of the adjusting screw 56.

The refrigerant, which is outputted from the second flow outlet 51e, is suctioned into the compressor 2 and is compressed once again. In contrast, the air, which is blown by the blower fan, is cooled at the evaporator 6 and is temperature adjusted to a target temperature by an undepicted heating heat exchanger (e.g., a hot water heater core), which is placed on the downstream side of the evaporator 6 in the flow direction of the air. Then, this temperature adjusted air is discharged into a vehicle cabin, which is an air conditioning subject space.

As discussed above, according to the present embodiment, the damper spring 60 limits the vibration of the valve piece 521 in the radial direction DRr of the valve axis AXv by generating the urging force Fp (see FIG. 6), which urges the body 51, at the location between the body 51 and the valve piece 521. The valve piece 521 releases the urging force Fp of the damper spring 60 when the valve piece 521 is moved beyond the predetermined displacement position toward the valve opening side. Thus, the radial vibration of the valve piece 521 can be limited by the damper spring 60 in a minute opening degree range of the restriction passage 51h, in which the valve piece 521 is not displaced beyond the predetermined displacement position toward the valve opening side.

In contrast, when the opening degree of the restriction passage 51h is increased beyond the minute opening degree range of the restriction passage 51h, the urging force Fp of the damper spring 60 is no longer required. In such a case, the urging force Fp of the damper spring 60 is released. That is, the damper spring 60 is not for always generating the resistance against the radial vibration of the valve piece 521. Rather, the damper spring 60 provides the structure that generates the resistance against the radial vibration in the opening degree range of the restriction passage 51h, in which the radial vibration of the valve piece 521 would be generated, as well as an adjacent range of the restriction passage 51h, which is adjacent to this opening degree range of the restriction passage 51h.

Therefore, even in the case where the urging force Fp of the damper spring 60 is likely to generate wearing at any part of the exposed surface of the body 51, which is exposed to the valve chamber 51g, the wearing of the body 51 can be limited by releasing the urging force Fp.

In the expansion valve that is the valve device disclosed in the patent literature 1, at the time of installing the valve support, which has the function of the damper spring, into the valve chamber, the valve support is slid along the peripheral wall surface of the valve chamber over the inlet port, which corresponds to the communication opening 51n (see FIG. 2) of the present embodiment. Therefore, there is a possibility of that the expansion valve of the patent literature 1 interferes with the inlet port. It is conceivable that the valve support is deformed by this interference.

Furthermore, in order to limit the interference of the valve support with the inlet port at the time of installing the valve support in the expansion valve of the patent literature 1, it is conceivable that the slidable range of the valve support along the peripheral wall surface of the valve chamber is placed on the adjusting screw side of the inlet port. However, this will result in an increase in a length of the valve chamber in the axial direction, and thereby the entire length of the expansion valve is increased.

In contrast, according to the present embodiment, the damper spring 60 contacts the spring contact surface 511 of the body 51, as shown in FIGS. 2 and 7. However, the outer diameter Dpv of the damper spring 60 is kept to be smaller than the inner diameter Dvr of the valve chamber peripheral wall surface 512 even when the valve piece 521 is moved to any position in the valve axial direction DRax. Furthermore, even when the valve piece 521 is moved to any position in the valve axial direction DRax, the damper spring 60 is kept spaced away from the valve chamber peripheral wall surface 512. Therefore, the interference between the damper spring 60 and the communication opening 51n of the body 51 can be avoided at the time of installing the damper spring 60. In other words, the communication opening 51n can be formed in the valve chamber peripheral wall surface 512 as in the present embodiment without a need for considering the interference between the damper spring 60 and the communication opening 51n at the time of installing the damper spring 60. In this way, for example, the limitations at the time of installing the damper spring 60 into the valve chamber 51g can be significantly alleviated. Furthermore, an increase in the entire length of the thermal expansion valve 5 does not occur. Therefore, the size of the thermal expansion valve 5 can be minimized.

As discussed above, the damper spring 60 contacts the body 51 to limit the radial vibration of the valve piece 521 as long as the valve piece 521 is not moved beyond the predetermined displacement position toward the valve opening side. In contrast, when the valve piece 521 is moved beyond the predetermined displacement position toward the valve opening side, the damper spring 60 does not interfere the movement of the valve piece 521, and it is possible to limit scraping of the valve chamber peripheral wall surface 512, which would be otherwise caused by sliding of the damper spring 60 along the valve chamber peripheral wall surface 512. Furthermore, at the time of installing the valve piece 521, the coil spring 54, the adjusting screw 56 and the damper spring 60 to the body 51, it is not required to contact the damper spring 60 to the valve chamber peripheral wall surface 512. Therefore, it is possible to limit the catching of the damper spring 60 along the valve chamber peripheral wall surface 512, and it is possible to improve the installability of the damper spring 60. Therefore, the outer diameter Dpv of the damper spring 60 is relatively defined with respect to the inner diameter Dvr of the valve chamber peripheral wall surface 512. For example, the outer diameter Dpv of the damper spring 60 is set such that the damper spring 60 does not contact the valve chamber peripheral wall surface 512 even when the valve piece 521 and the coil spring 54 are laterally dispositioned from the initially set position thereof.

Furthermore, in the expansion valve of the patent literature 1, the valve support is slid along the peripheral wall surface of the valve chamber. Therefore, the spring load (i.e., the spring constant) of the valve support in the radial direction needs to be reduced. Thus, it is difficult for the valve support to provide the sufficient damper effect against the radial vibration of the valve piece. In contrast, in the present embodiment, the damper spring 60 does not slide along the valve chamber peripheral wall surface 512. Therefore, it is possible to set the spring load of the damper spring 60 such that the damper spring 60 provides the sufficient damper effect against the radial vibration of the valve piece 521.

Furthermore, in the present embodiment, the spring contact surface 511 of the body 51 is shaped into the tapered form that circumferentially extends around the valve axis AXv. Therefore, in comparison to the case where the spring contact surface 511 is a planar surface that is perpendicular to the valve axis AXv, the damper effect can be more efficiently obtained against the radial vibration of the valve piece 521.

Furthermore, according to the present embodiment, as shown in FIGS. 5A-5C, when the distal end surface 602a of the damper spring 60 contacts the spring contact surface 511 of the body 51 in response to the displacement of the valve piece 521 toward the valve closing side, the contact between the distal end surface 602a and the spring contact surface 511 begins from the outer side of the distal end surface 602a in the radial direction of the valve axis AXv. After the start of the contact, the damper spring 60 is flexed such that when the valve piece 521 is moved toward the valve closing side, the tilt angle A1 of the distal end surface 602a relative to the spring contact surface 511 of the body 51 is progressively reduced. Thus, in the minute opening degree range of the restriction passage 51h, in which the valve piece 521 is not displaced beyond the predetermined displacement position toward the valve opening side, the urging force Fp of FIG. 6 can be generated by the damper spring 60. In contrast, when the valve piece 521 is moved beyond the predetermined displacement position toward the valve opening side, the urging force Fp of the damper spring 60 can be released. Thereby, the noise of the thermal expansion valve 5 can be effectively limited.

Furthermore, according to the present embodiment, as shown in FIG. 2, the damper spring 60 includes the clampable portion 601, which is clamped between the ring surface 523c of the ball valve support portion 523 and the coil spring 54, and the plurality of extending portions 602, which extend from the clampable portion 601. Each of the extending portions 602 contacts the spring contact surface 511 of the body 51 through the fraction (specifically, the distal end surface 602a) of the extending portion 602. Therefore, the damper spring 60 can be integrally fixed to the valve piece 521 through use of the urging force of the coil spring 54. Thereby, it is not required to join the damper spring 60 and the valve piece 521 together by, for example, welding.

Furthermore, according to the present embodiment, as shown in FIG. 6, the urging force Fp of the damper spring 60 includes the force component Fpa that is directed in the valve axial direction DRax. Therefore, when the taper angle of the spring contact surface 511 is set to adjust the force component Fpa to an appropriate strength, the radial vibration of the valve piece 521 can be more effectively limited in comparison to the valve device of the patent literature 1.

Furthermore, according to the present embodiment, as shown in FIGS. 3 and 4, the damper spring 60 is formed through, for example, stamping of the thin leaf spring material. Thus, the shape of the damper spring 60 can be simplified in comparison to the valve support of the valve device of the patent literature 1.

Second Embodiment

Next, a second embodiment will be described. In the present embodiment, differences, which are different from the first embodiment, will be mainly described. Furthermore, the parts, which are identical to or equivalent to the parts of the previous embodiment, will not be described or described in a simple manner. This is also true for the third embodiment and the subsequent embodiments.

Figure 8:
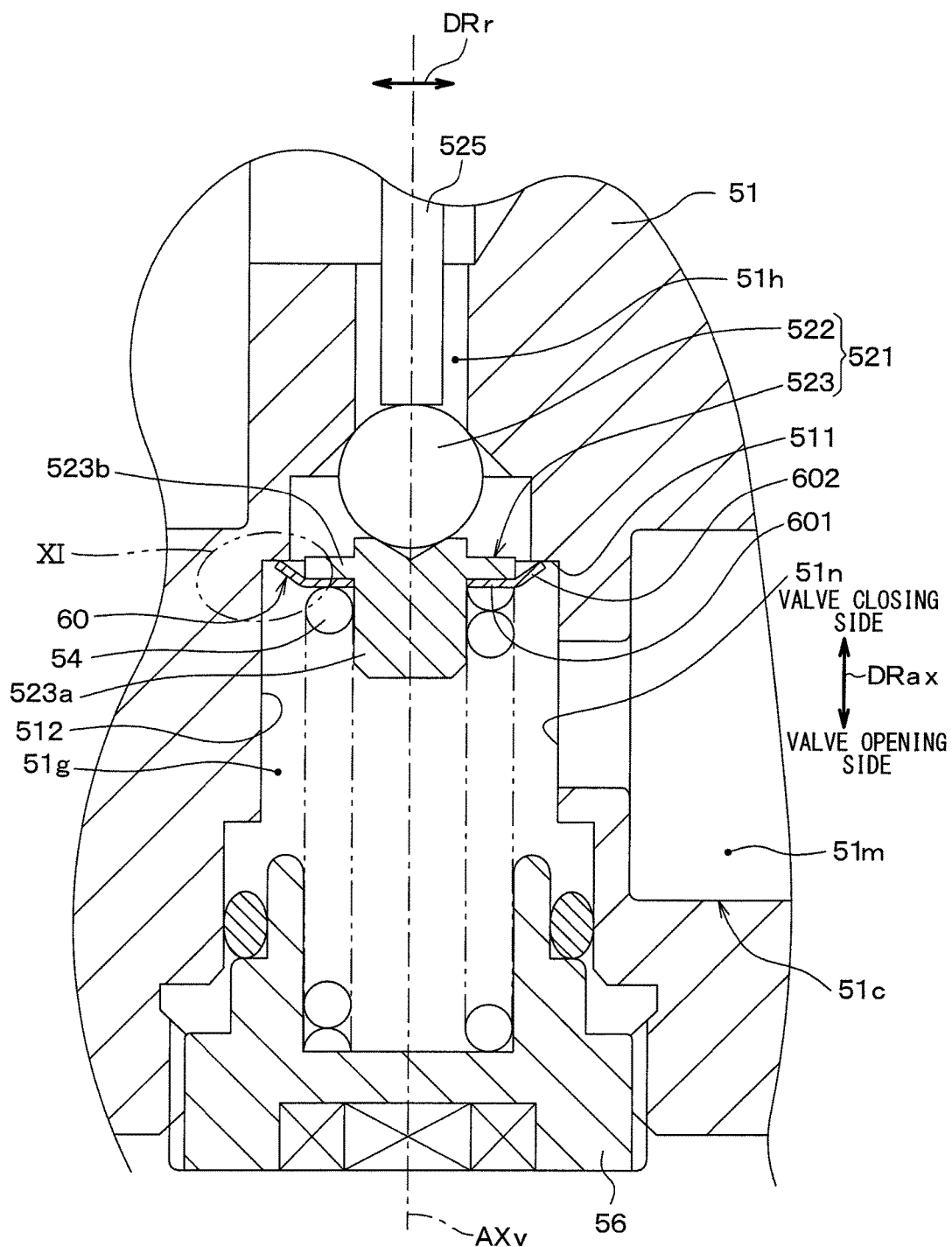
FIG. 8 is an enlarged view showing the portion II in FIG. 1 according to a second embodiment, i.e., an enlarged view of a valve chamber and a restriction passage of a thermal expansion valve of the second embodiment, corresponding to FIG. 2 of the first embodiment.

FIG. 8 is an enlarged view showing the portion II in FIG. 1 according to the present embodiment, i.e., an enlarged view of the valve chamber 51g and the restriction passage 51h of the thermal expansion valve 5 of the present embodiment, corresponding to FIG. 2 of the first embodiment. In the thermal expansion valve 5 of the present embodiment, the shape of the damper spring 60 is simplified in comparison to the first embodiment.

Specifically, as shown in FIG. 8, the spring contact surface 511 of the body 51 is formed as a surface that faces in the valve axial direction DRax, i.e., a surface that is perpendicular to the valve axis AXv. The damper spring 60 contacts the spring contact surface 511 to generate the urging force Fp (see FIG. 6). Thus, the urging force Fp of the damper spring 60 does not include the force component Fpr (see FIG. 6), which is directed in the radial direction DRr of the valve axis AXv, and thereby the urging force Fp of the damper spring 60 includes only the force component Fpa, which is directed in the valve axial direction DRax.

Figure 9:
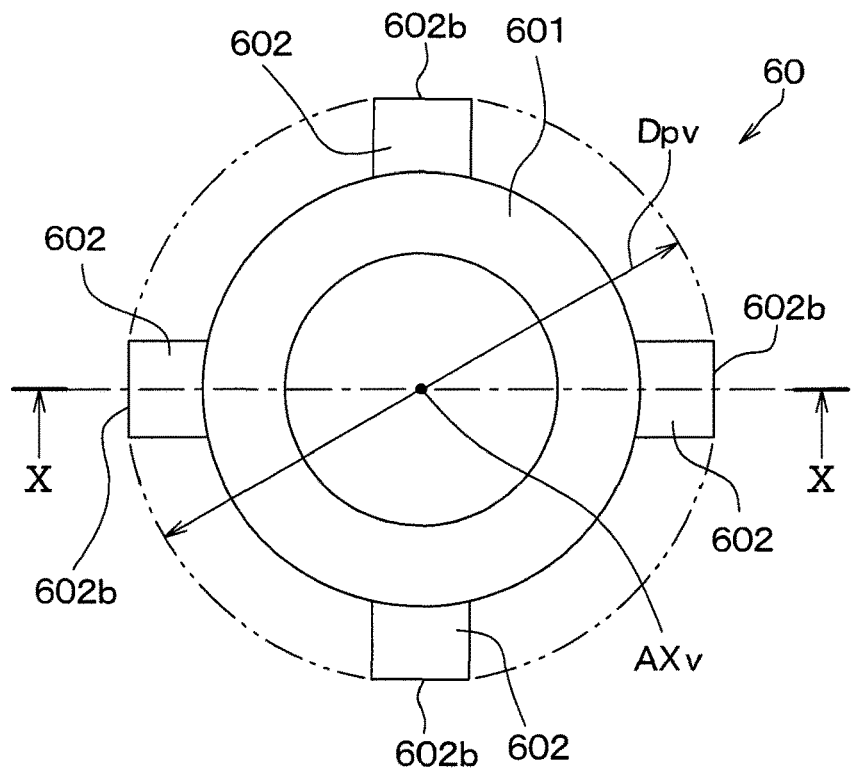
FIG. 9 is a view of a damper spring alone viewed from the restriction passage side along a valve axis according to the second embodiment.
Figure 10:
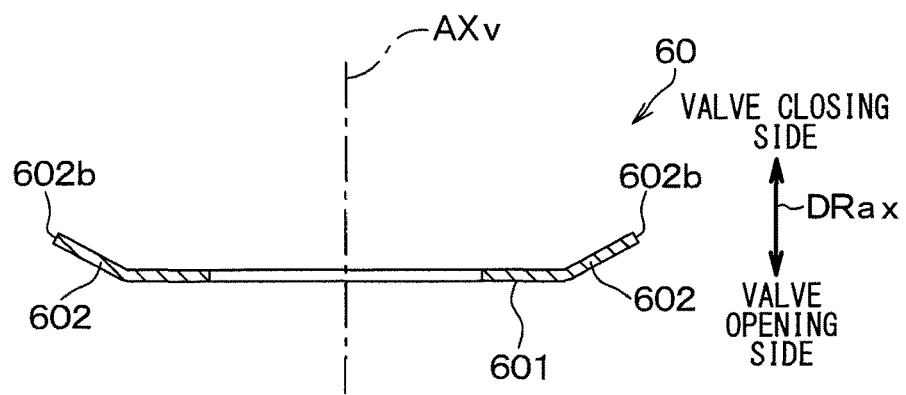
FIG. 10 is a cross-sectional view taken along line X-X in FIG. 9.

FIG. 9 is a view of the damper spring 60 alone viewed from the restriction passage 51h side along the valve axis AXv according to the present embodiment. FIG. 10 is a cross-sectional view taken along line X-X in FIG. 9. As shown in FIGS. 9 and 10, the damper spring 60 of the present embodiment includes the clampable portion 601 and the plurality of extending portions 602 like in the first embodiment. Furthermore, the clampable portion 601 is shaped into the circular ring form like in the first embodiment and is clamped between the ring surface 523c of the ball valve support portion 523 and the coil spring 54.

Like in the first embodiment, the number of the extending portions 602 is four, and the extending portions 602 extend obliquely and radially from the clampable portion 601 about the valve axis AXv. Specifically, each extending portion 602 extends from a base end part of the extending portion 602, which is joined to the clampable portion 601, to a distal end part of the extending portion 602 toward a radially outer side in the radial direction DRr of the valve axis AXv and also toward the restriction passage 51h side in the valve axial direction DRax.

However, unlike the first embodiment, the extending portion 602 does not have the distal end surface 602a (see FIG. 4), and the extending portion 602 contacts the spring contact surface 511 of the body 51 through a distal end edge 602b formed at a distal end of the extending portion 602. Specifically, the extending portion 602 includes a limiting-member side contact part 602f and a tilted part 602g. The limiting-member side contact part 602f is formed as an edge of the distal end edge 602b, which is located at the spring contact surface 511 side. The tilted part 602g is tilted relative to the spring contact surface 511 of the body 51. The damper spring 60 is contactable with the spring contact surface 511 through the limiting-member side contact part 602f, and the tilted part 602g inwardly extends from the limiting-member side contact part 602f in the radial direction DRr (see FIG. 8).

Figure 11A:
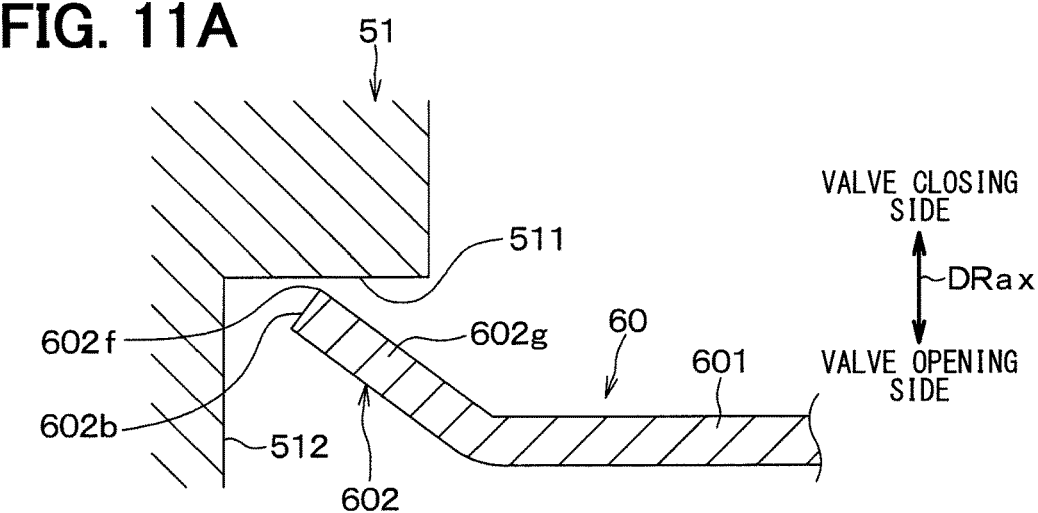
FIG. 11A is an enlarged view of a portion XI in FIG. 8, showing a state where the damper spring is spaced from the spring contact surface of the body unlike FIG. 8.

As described above, since the damper spring 60 includes the tilted part 602g, the limiting-member side contact part 602f of the damper spring 60 is placed closest to the spring contact surface 511 of the body 51 in the valve axial direction DRax in the free state of the damper spring 60, in which the damper spring 60 is spaced away from the spring contact surface 511 of the body 51, as shown in FIG. 11A.

Figure 11B:
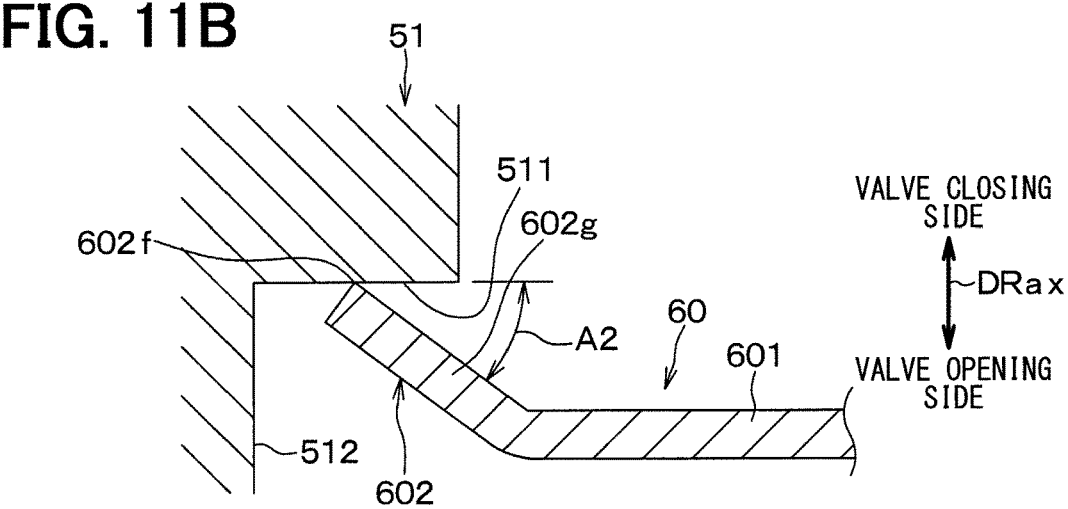
FIG. 11B is a view of the same portion as that of FIG. 11A, showing a state where the damper spring begins to contact the spring contact surface of the body after movement of the valve piece from the state of FIG. 11A toward the valve closing side.

Therefore, as shown in FIG. 11B, when the damper spring 60 contacts the spring contact surface 511 of the body 51 in response to the movement of the valve piece 521 toward the valve closing side, the damper spring 60 contacts the spring contact surface 511 through the limiting-member side contact part 602f.

Figure 11C:
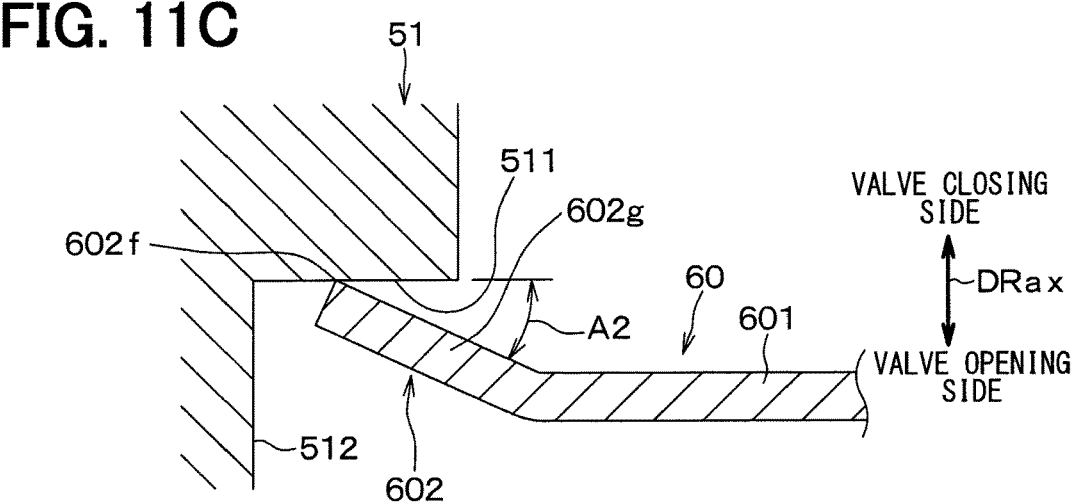
FIG. 11C is a view of the same portion as that of FIG. 11A, showing a state of the damper spring that is in a valve closing state where the valve piece closes the restriction passage after movement of the valve piece from the state shown in FIG. 11B toward the valve closing side.

After the contacting of the limiting-member side contact part 602f to the spring contact surface 511 of the body 51 in response to the movement of the valve piece 521 toward the valve closing side, the damper spring 60 is flexed in a manner shown in FIG. 11C at a valve closing side stroke end of the valve piece 521. That is, after occurrence of contact of the limiting-member side contact part 602f to the spring contact surface 511 of the body 51, the damper spring 60 is flexed such that a tilt angle A2 of the tilted part 602g relative to the spring contact surface 511 of the body 51 is progressively reduced when the valve piece 521 is moved toward the valve closing side.

Figure 12:
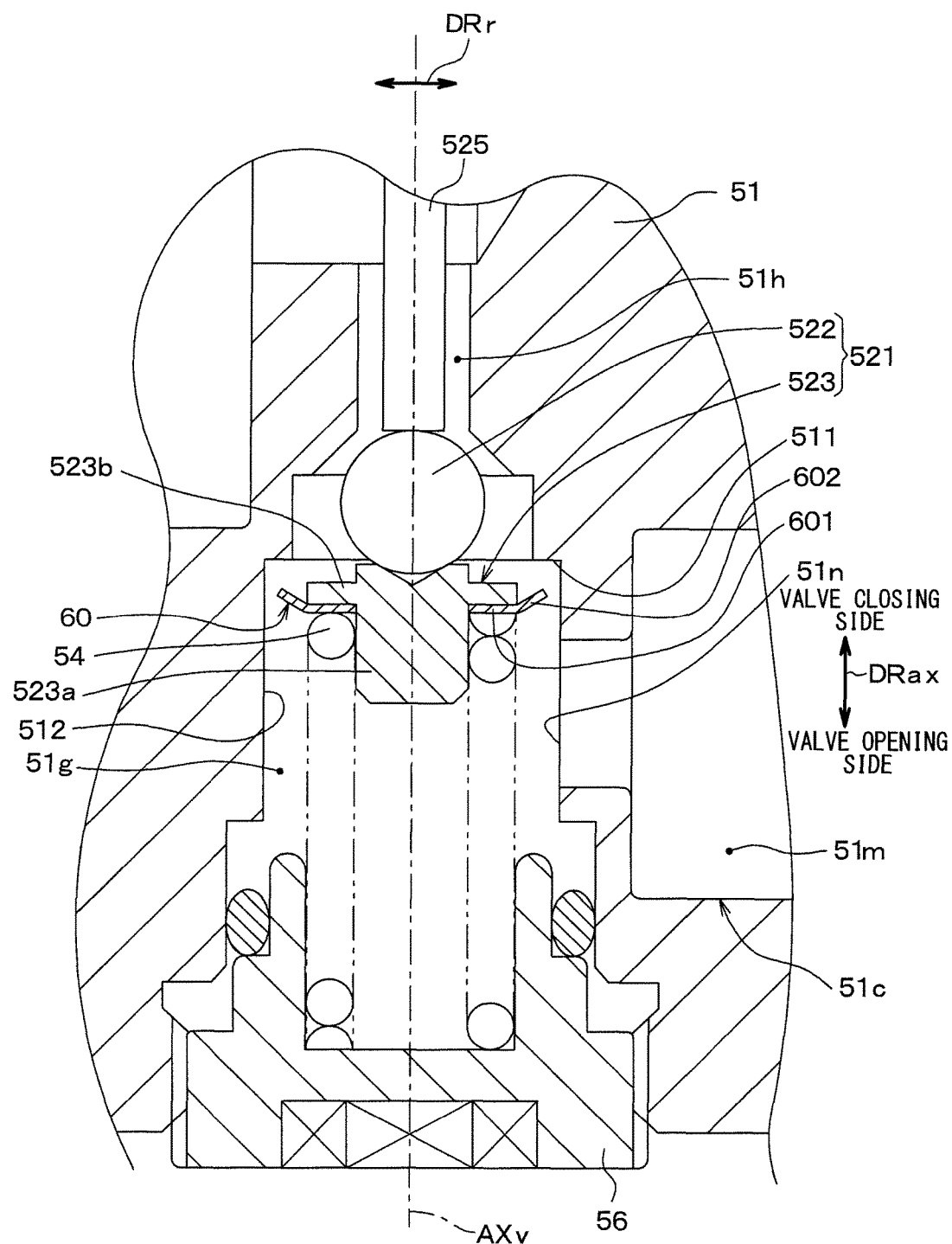
FIG. 12 is a cross-sectional view that corresponds to FIG. 7 of the first embodiment, showing the same portion as that of FIG. 8 according to the second embodiment, and indicating a state where the valve piece is moved beyond a predetermined displacement position toward the valve opening side.

Similar to the first embodiment, even in the present embodiment, when the valve piece 521 is moved beyond the predetermined displacement position toward the valve opening side, the damper spring 60 is spaced away from the spring contact surface 511 of the body 51 to release the urging force Fp of the damper spring 60, as shown in FIG. 12. FIG. 12 is a diagram that corresponds to FIG. 7 of the first embodiment. That is, FIG. 12 is a cross-sectional view that shows the same portion as that of FIG. 8, indicating the state where the valve piece 521 is moved beyond the predetermined displacement position toward the valve opening side.

Referring back to FIG. 8, in the case where the urging force Fp (see FIG. 6) of the damper spring 60 is generated, the radial vibration of the valve piece 521 is limited by the frictional force between the spring contact surface 511 of the body 51 and the distal end edge 602b (see FIG. 10) of the damper spring 60 and the frictional force between the clampable portion 601 of the damper spring 60 and the ring surface 523c of the ball valve support portion 523.

In the present embodiment, the advantages, which are achieved by the common structure that is common to the first embodiment, can be achieved like in the first embodiment. Furthermore, according to the present embodiment, the spring contact surface 511 of the body 51 faces in the valve axial direction DRax. Therefore, it is possible to implement the structure that can more easily absorb the decentering, which occurs between the spring contact surface 511 and the damper spring 60, in comparison to the first embodiment.

Furthermore, according to the present embodiment, as shown in FIGS. 11A-11C, after the contacting of the limiting-member side contact part 602f to the spring contact surface 511 of the body 51 in response to the movement of the valve piece 521 toward the valve closing side, the damper spring 60 is progressively flexed to progressively reduce the tilt angle A2 of FIG. 11B when the valve piece 521 is kept moved toward the valve closing side. Thus, in the minute opening degree range of the restriction passage 51h, in which the valve piece 521 is not displaced beyond the predetermined displacement position toward the valve opening side, the urging force Fp (see FIG. 6) can be generated by the damper spring 60. In contrast, when the valve piece 521 is moved beyond the predetermined displacement position toward the valve opening side, the urging force Fp of the damper spring 60 can be released. In this way, similar to the first embodiment, the noise of the thermal expansion valve 5 can be effectively limited.

Third Embodiment

Next, a third embodiment will be described. In the present embodiment, differences, which are different from the second embodiment, will be mainly described.

Figure 13:
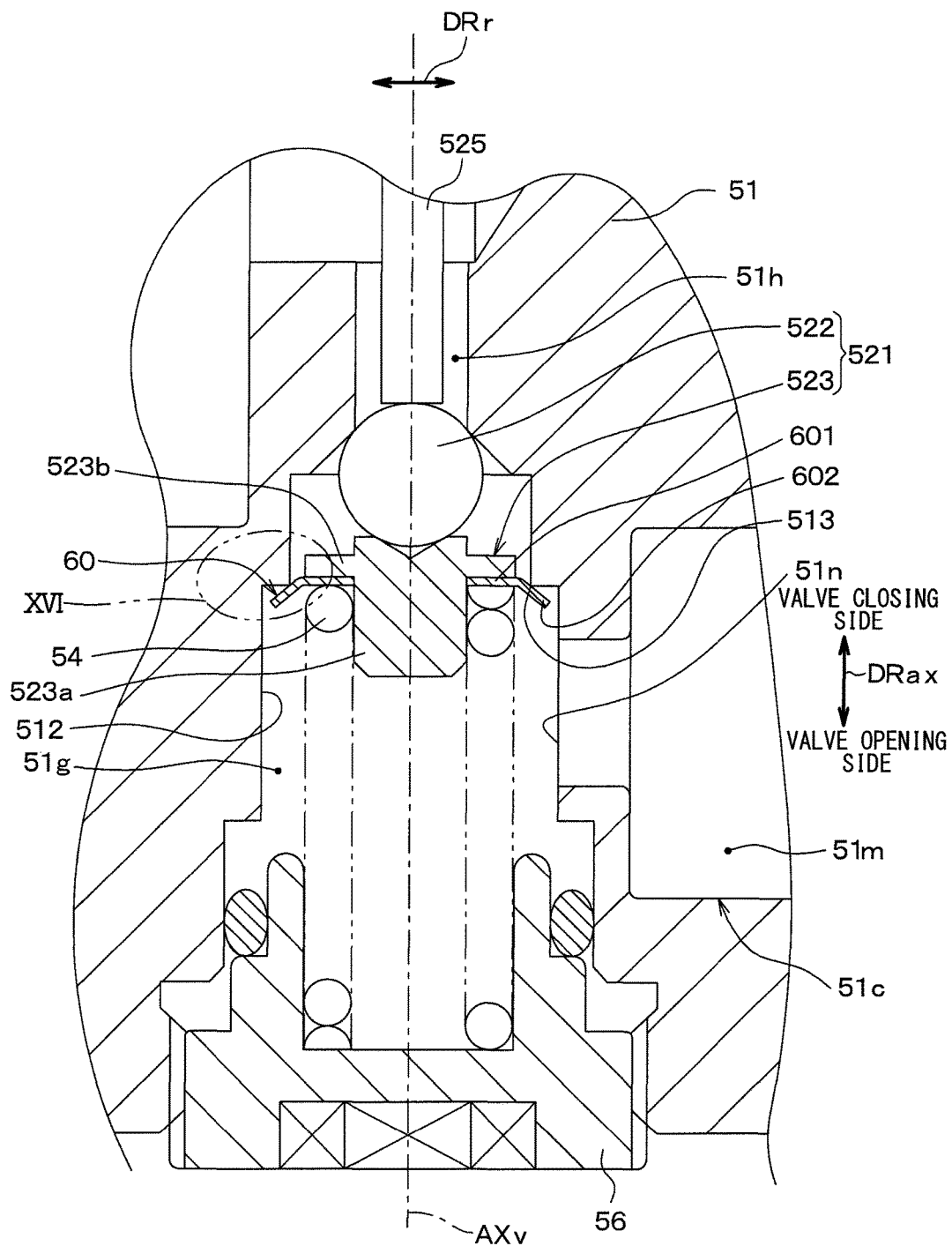
FIG. 13 is an enlarged view showing the portion II in FIG. 1 according to a third embodiment, i.e., an enlarged view of a valve chamber and a restriction passage of a thermal expansion valve of the third embodiment, corresponding to FIG. 8 of the second embodiment.

FIG. 13 is an enlarged view showing the portion II in FIG. 1 according to the present embodiment, i.e., an enlarged view of the valve chamber 51g and the restriction passage 51h of the thermal expansion valve 5 of the present embodiment, corresponding to FIG. 8 of the second embodiment. In the damper spring 60 of the thermal expansion valve 5 of the present embodiment, the extending direction of each of the extending portions 602 from the clampable portion 601 is opposite to that of the second embodiment in the valve axial direction DRax.

Figure 14:
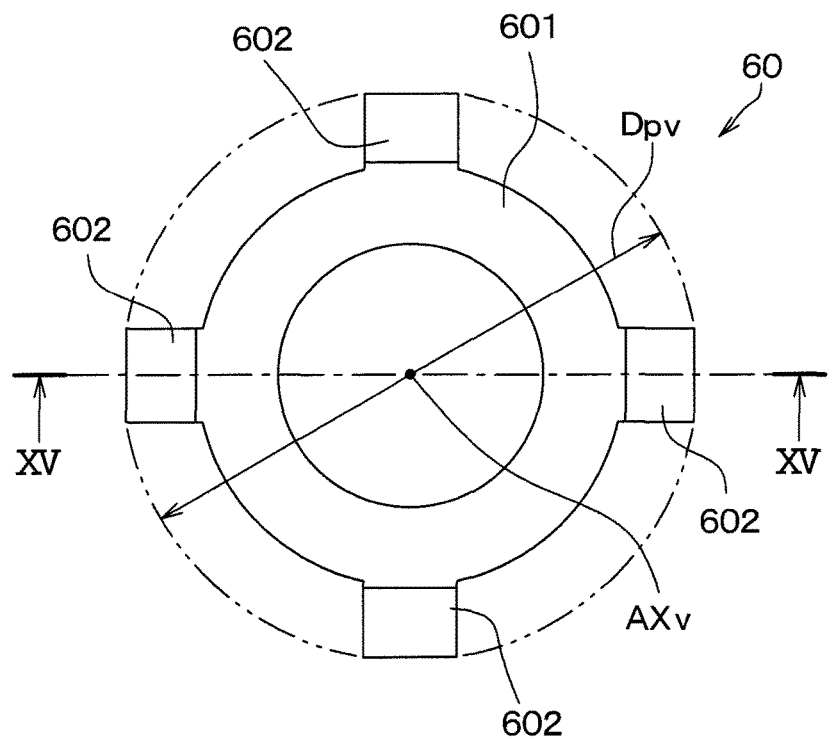
FIG. 14 is a view of a damper spring alone viewed from the restriction passage side along a valve axis according to the third embodiment.
Figure 15:
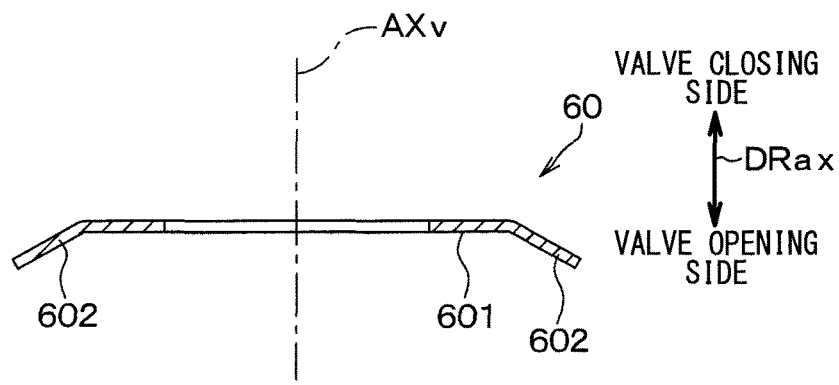
FIG. 15 is a cross-sectional view taken along line XV-XV in FIG. 14.

Specifically, as shown in FIG. 13, the extending portions 602 of the damper spring 60 extend obliquely and radially from the clampable portion 601 about the valve axis AXv. With respect to this point, the extending portions 602 of the present embodiment are similar to the second embodiment. However, as shown in FIGS. 13 to 15, each extending portion 602 extends from a base end part of the extending portion 602, which is joined to the clampable portion 601, to a distal end part of the extending portion 602 toward a radially outer side in the radial direction DRr of the valve axis AXv and also toward the opposite side, which is opposite from the restriction passage 51h in the valve axial direction DRax. The extending portions 602 of the present embodiment are different from those of the second embodiment with respect to this point. That is, each of the extending portions 602 of the present embodiment includes a tilted part 602h (see FIG. 16A), which is tilted relative to the valve axis AXv in such a manner that the tilted part 602h is progressively displaced toward the valve opening side of the valve piece 521 in the valve axial direction DRax from a radially inner side toward a radially outer side of tilted part 602h in the radial direction DRr of the valve axis AXv.

Therefore, the body 51 contacts the extending portions 602 of the damper spring 60 through a corner 513 of a step that is formed into a circular ring form around the valve axis AXv and is exposed in the valve chamber 51g. That is, the corner 513 serves as a contact portion that contacts the damper spring 60. The tilted part 602h of the damper spring 60 contacts the corner 513 of the body 51 through a fraction of a corner side surface 602i (see FIG. 16A) of the tilted part 602h located on the corner 513 side. Each extending portion 602 may include or may not include another part that is other than the tilted part 602h. FIG. 14 is a view of the damper spring 60 alone viewed from the restriction passage 51h side along the valve axis AXv according to the present embodiment. FIG. 15 is a cross-sectional view taken along line XV-XV in FIG. 14.

As discussed above, the tilted part 602h of the damper spring 60 contacts the corner 513 of the body 51 through the fraction of the tilted part 602h. Therefore, the tilted part 602h of the damper spring 60 is placed in the state shown in FIG. 16A in the free state where the damper spring 60 is spaced away from the corner 513 of the body 51. As shown in FIG. 16B, at the time of contacting the damper spring 60 to the corner 513 of the body 51 in response to the movement of the valve piece 521 toward the valve closing side, the damper spring 60 contacts the corner 513 through the fraction of the corner side surface 602i of the tilted part 602h.

Figure 16A:
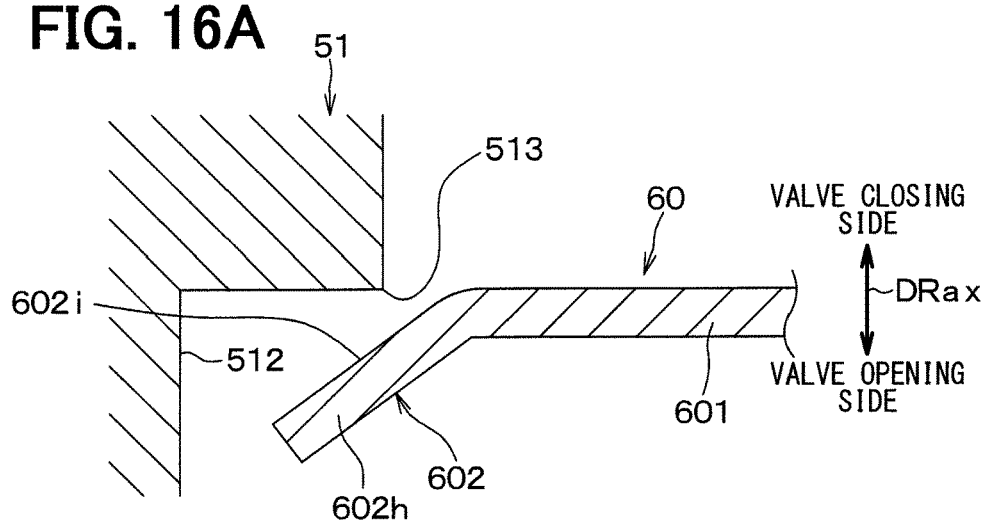
FIG. 16A is an enlarged view of a portion VXI in FIG. 13, showing a state where the damper spring is spaced from a corner of the body unlike FIG. 13.
Figure 16B:
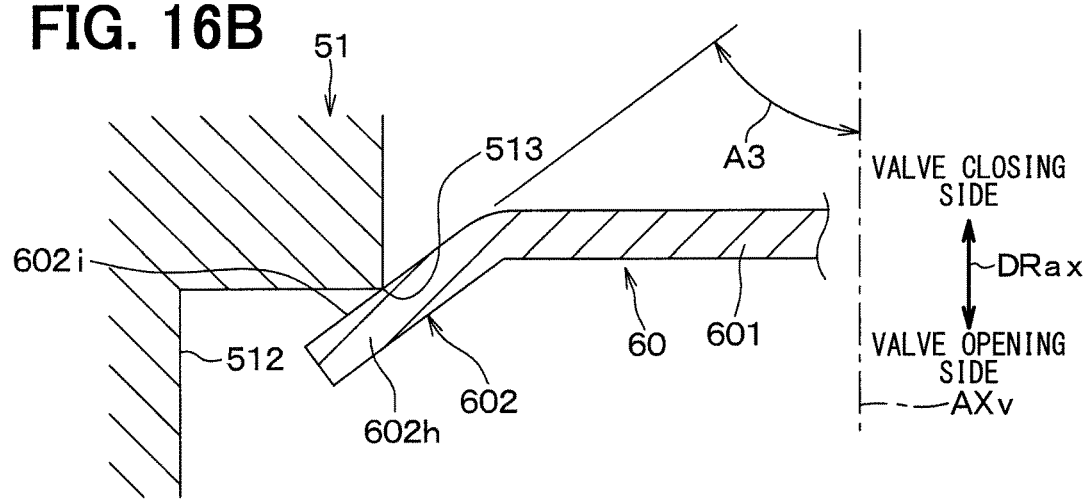
FIG. 16B is a view of the same portion as that of FIG. 16A, showing a state where the damper spring begins to contact the corner of the body after movement of the valve piece from the state of FIG. 16A toward the valve closing side.
Figure 16C:
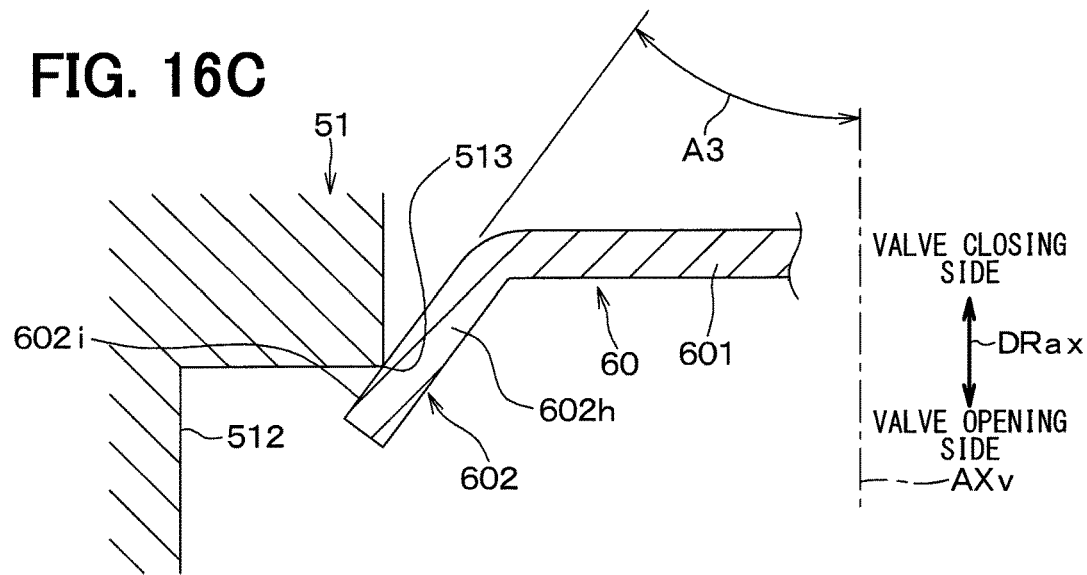
FIG. 16C is a view of the same portion as that of FIG. 16A, showing a state of the damper spring that is in a valve closing state where the valve piece closes the restriction passage after movement of the valve piece from the state shown in FIG. 16B toward the valve closing side.

Furthermore, after the contacting of the tilted part 602h of the damper spring 60 to the corner 513 of the body 51 in response to the movement of the valve piece 521 toward the valve closing side, the damper spring 60 is flexed in a manner shown in FIG. 16C at the valve closing side stroke end of the valve piece 521. That is, after occurrence of contact of the tilted part 602h to the corner 513 of the body 51, the damper spring 60 is flexed such that a tilt angle A3 of the tilted part 602h relative to the valve axis AXv is progressively reduced when the valve piece 521 is moved toward the valve closing side.

Figure 17:
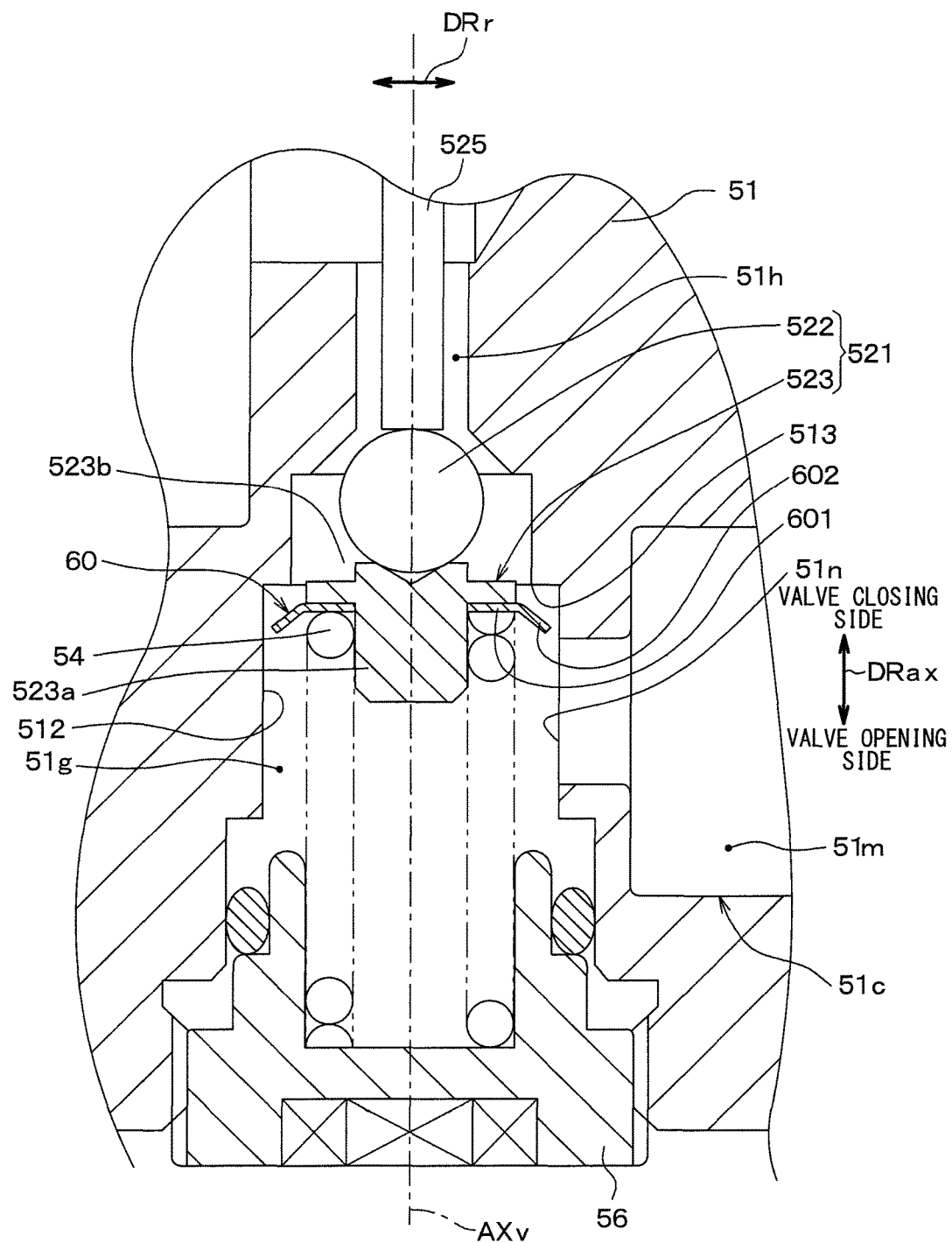
FIG. 17 is a cross-sectional view that corresponds to FIG. 12 of the second embodiment, showing the same portion as that of FIG. 13 according to the third embodiment, and indicating a state where the valve piece is moved beyond a predetermined displacement position toward the valve opening side.

Similar to the second embodiment, even in the present embodiment, when the valve piece 521 is moved beyond the predetermined displacement position toward the valve opening side, the damper spring 60 is spaced away from the corner 513 of the body 51 to release the urging force Fp (see FIG. 6) of the damper spring 60. FIG. 17 is a cross-sectional view that corresponds to FIG. 12 of the second embodiment. That is, FIG. 17 is a cross-sectional view that shows the same portion as that of FIG. 13, indicating the state where the valve piece 521 is moved beyond the predetermined displacement position toward the valve opening side.

In the present embodiment, the advantages, which are achieved by the common structure that is common to the second embodiment, can be achieved like in the second embodiment.

Furthermore, according to the present embodiment, as shown in FIGS. 16A-16C, after occurrence of the contact of the tilted part 602h of the damper spring 60 to the corner 513 of the body 51 in response to the movement of the valve piece 521 toward the valve closing side, the damper spring 60 is progressively flexed to progressively reduce the tilt angle A3 of FIG. 16B when the valve piece 521 is kept moved toward the valve closing side. Thus, in the minute opening degree range of the restriction passage 51h, in which the valve piece 521 is not displaced beyond the predetermined displacement position toward the valve opening side, the urging force Fp (see FIG. 6) can be generated by the damper spring 60. In contrast, when the valve piece 521 is moved beyond the predetermined displacement position toward the valve opening side, the urging force Fp of the damper spring 60 can be released. In this way, similar to the second embodiment, the noise of the thermal expansion valve 5 can be effectively limited.

Fourth Embodiment

Next, a fourth embodiment will be described. In the present embodiment, differences, which are different from the second embodiment, will be mainly described.

Figure 18:
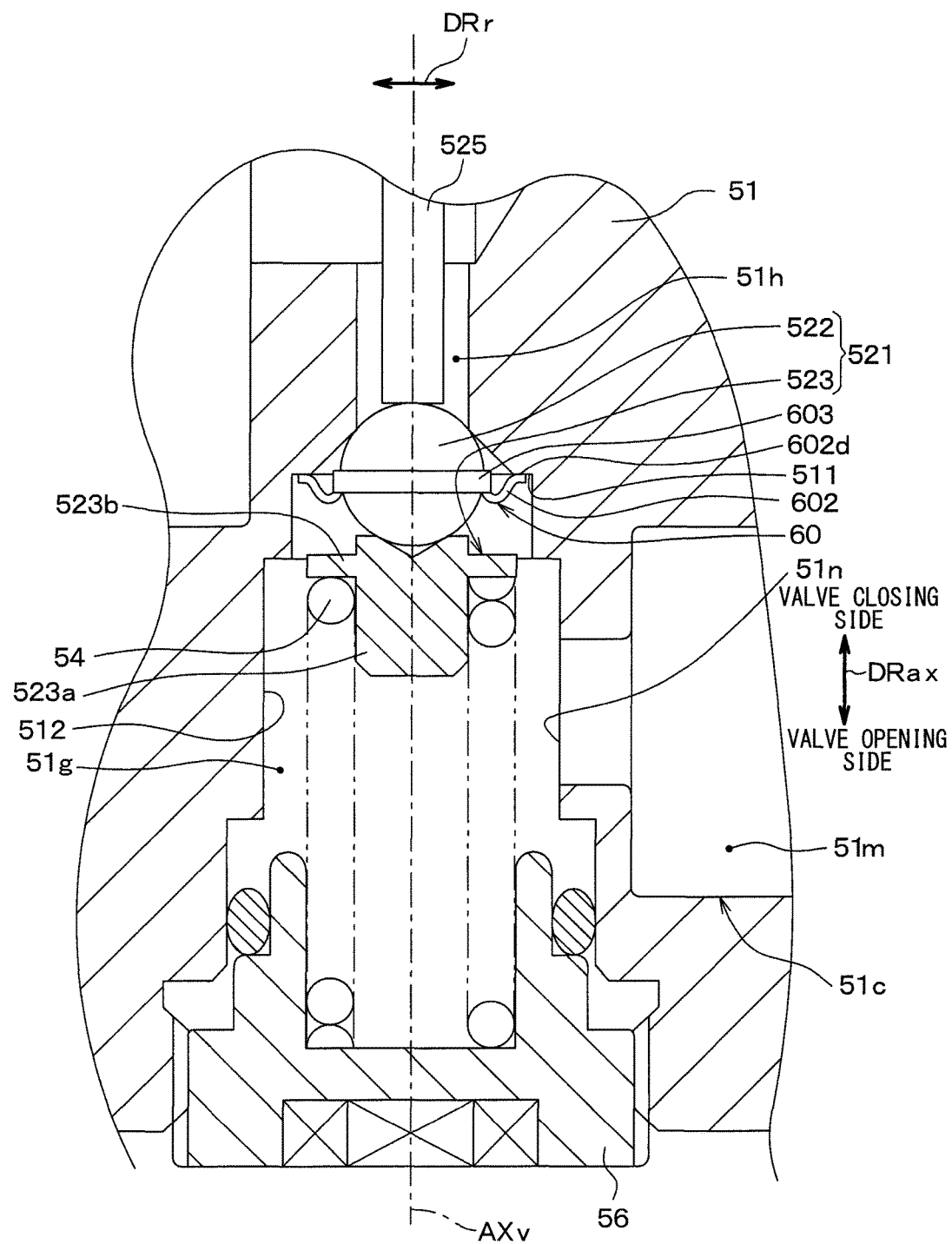
FIG. 18 is an enlarged view showing the portion II in FIG. 1 according to a fourth embodiment, i.e., an enlarged view of a valve chamber and a restriction passage of a thermal expansion valve of the fourth embodiment, corresponding to FIG. 8 of the second embodiment.

FIG. 18 is an enlarged view showing the portion II in FIG. 1 according to the present embodiment, i.e., an enlarged view of the valve chamber 51g and the restriction passage 51h of the thermal expansion valve 5 of the present embodiment, corresponding to FIG. 8 of the second embodiment. In the thermal expansion valve 5 of the present embodiment, the installation position of the damper spring 60 is different from that of the second embodiment.

Specifically, as shown in FIG. 18, the damper spring 60 includes a joint portion 603 in place of the clampable portion 601 of the second embodiment. The joint portion 603 is shaped into a circular ring form that continuously extends in a circumferential direction about the valve axis AXv while a radial direction DRr of the valve axis AXv serves as a thickness direction of the joint portion 603. As shown in FIG. 18, a ball valve portion 522 is fitted into an inside of the joint portion 603 of the damper spring 60, and the joint portion 603 is integrally fixed to the ball valve portion 522 by, for example, welding or bonding.

Figure 19:
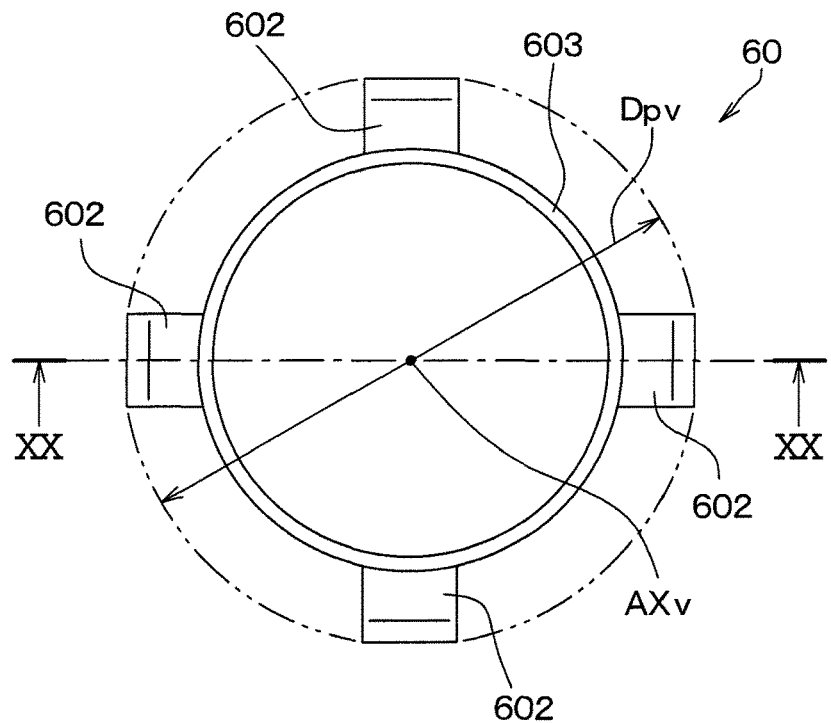
FIG. 19 is a view of a damper spring alone viewed from the restriction passage side along a valve axis according to the fourth embodiment.
Figure 20:
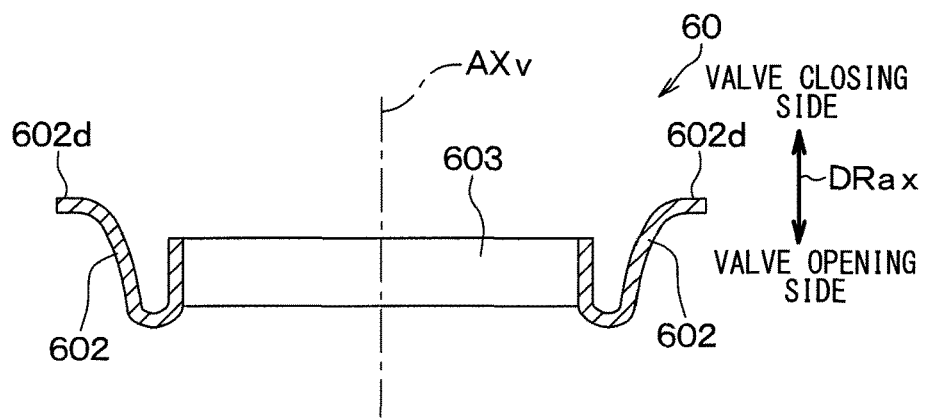
FIG. 20 is a cross-sectional view taken along line XX-XX in FIG. 19.

Furthermore, as shown in FIGS. 19 and 20, the number of the extending portions 602 of the damper spring 60 is four, and the extending portions 602 extend obliquely and radially from the joint portion 603 about the valve axis AXv. As shown in FIG. 18, the damper spring 60 contacts the spring contact surface 511 of the body 51 through the distal end parts 602d of the extending portions 602 at the valve closing time and in the minute opening degree range of the restriction passage 51h. FIG. 19 is a view of the damper spring 60 alone viewed from the restriction passage 51*h* side along the valve axis AXv according to the present embodiment. FIG. 20 is a cross-sectional view taken along line XX-XX in FIG. 19.

Figure 21:
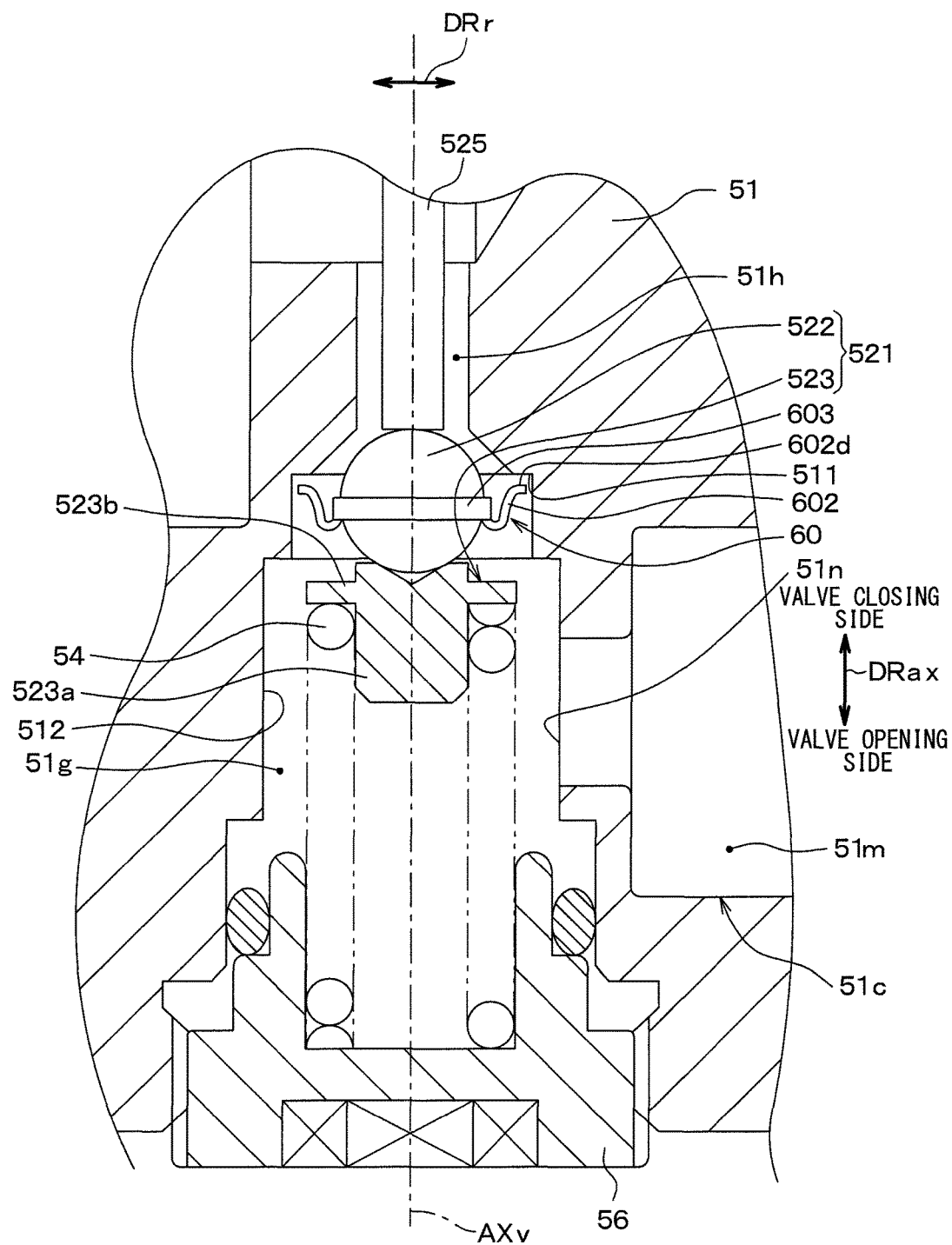
FIG. 21 is a cross-sectional view that corresponds to FIG. 12 of the second embodiment, showing the same portion as that of FIG. 18 according to the fourth embodiment, and indicating a state where the valve piece is moved beyond a predetermined displacement position toward the valve opening side.

Similar to the second embodiment, even in the present embodiment, when the valve piece 521 is moved beyond the predetermined displacement position toward the valve opening side, the damper spring 60 is spaced away from the spring contact surface 511 of the body 51 to release the urging force Fp (see FIG. 6) of the damper spring 60. FIG. 21 is a diagram that corresponds to FIG. 12 of the second embodiment. That is, FIG. 21 is a cross-sectional view that shows the same portion as that of FIG. 18, indicating the state where the valve piece 521 is moved beyond the predetermined displacement position toward the valve opening side.

In the present embodiment, the advantages, which are achieved by the common structure that is common to the second embodiment, can be achieved like in the second embodiment. Furthermore, according to the present embodiment, the joint portion 603 of the damper spring 60 is fixed to the ball valve portion 522 by, for example, the welding or the bonding. Therefore, at the time of assembling the thermal expansion valve 5, the damper spring 60 and the ball valve portion 522 may be prefixed together to reduce the number of the assembling steps of the thermal expansion valve 5.

Fifth Embodiment

Next, a fifth embodiment will be described. In the present embodiment, differences, which are different from the second embodiment, will be mainly described.

Figure 22:
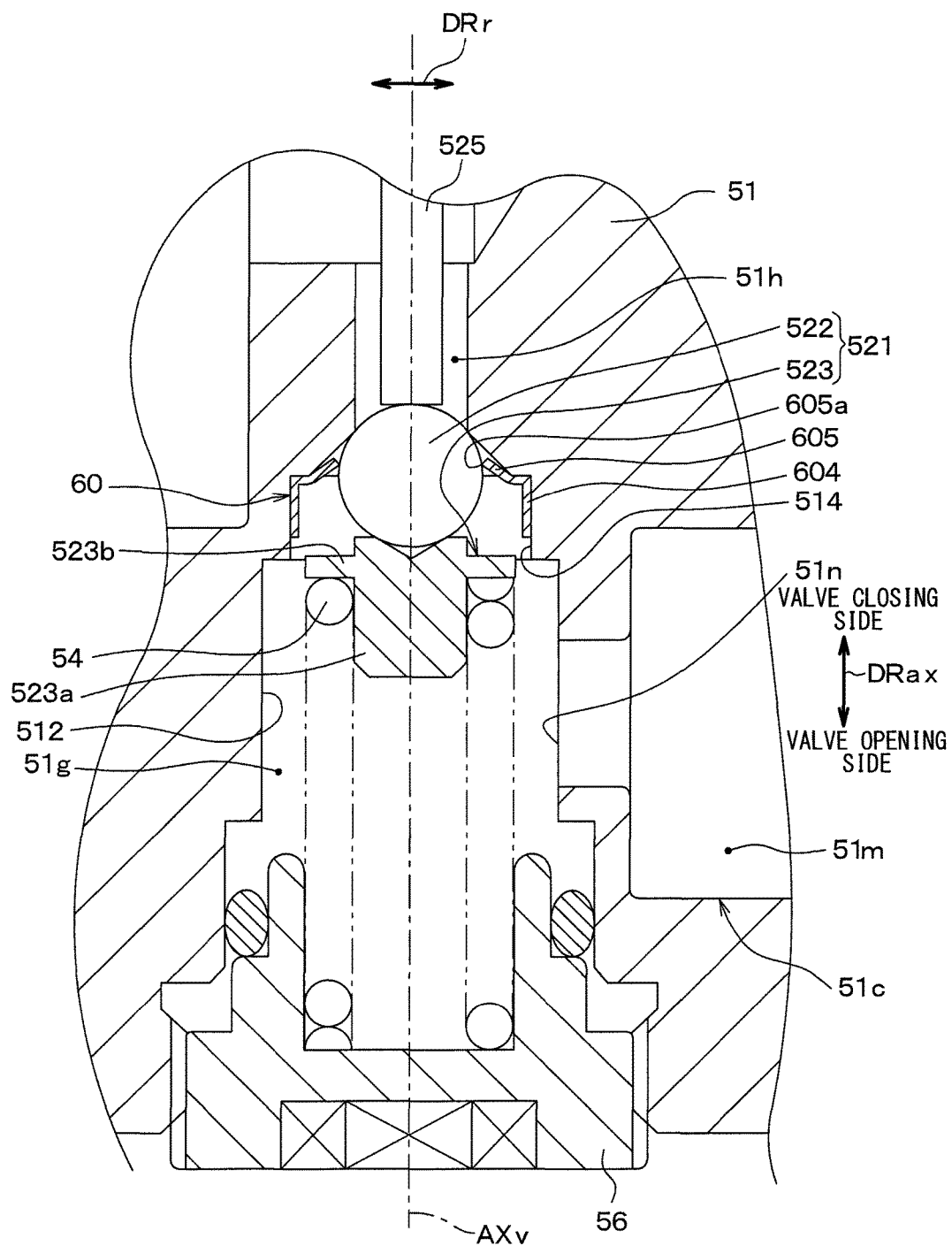
FIG. 22 is an enlarged view showing the portion II in FIG. 1 according to a fifth embodiment, i.e., an enlarged view of a valve chamber and a restriction passage of a thermal expansion valve of the fifth embodiment, corresponding to FIG. 8 of the second embodiment.

FIG. 22 is an enlarged view showing the portion II in FIG. 1 according to the present embodiment, i.e., an enlarged view of the valve chamber 51*g* and the restriction passage 51*h* of the thermal expansion valve 5 of the present embodiment, corresponding to FIG. 8 of the second embodiment. In the thermal expansion valve 5 of the present embodiment, as shown in FIG. 22, the damper spring 60 is fixed to the body 51 and is engageable and disengageable relative to the valve piece 521. The damper spring 60 generates the urging force Fp, which urges the body 51, at a location between the body 51 and the valve piece 521 through engagement of the damper spring 60 to the valve piece 521. This point is different from the second embodiment.

Figure 23:
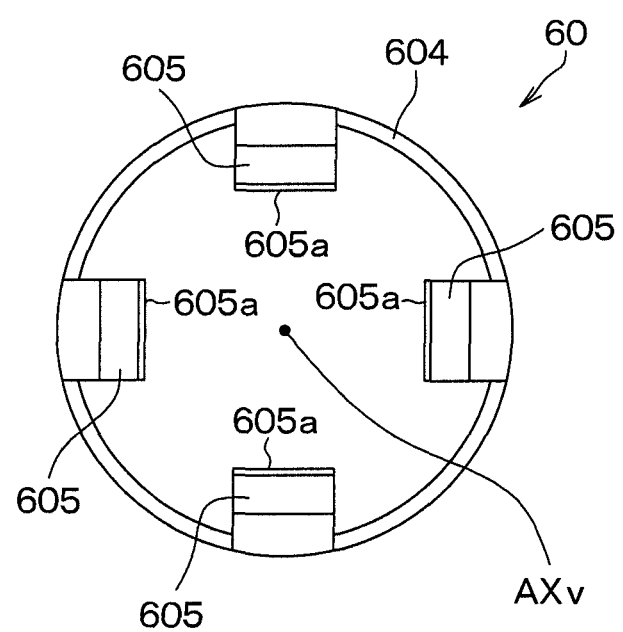
FIG. 23 is a view of a damper spring alone viewed from the restriction passage side along a valve axis according to the fifth embodiment.

Specifically, the damper spring 60 includes a fixing portion 604 and a plurality of extending portions 605 (see FIG. 23). The fixing portion 604 is shaped into a circular ring form that continuously extends in a circumferential direction about the valve axis AXv while a radial direction DRr of the valve axis AXv serves as a thickness direction of the fixing portion 604. The fixing portion 604 is fixed to an inner side of the spring installation surface 514 of the body 51 through for example, press fitting. The spring installation surface 514 is, for example, in a form of an inner surface of a cylinder. The spring installation surface 514 is a cylindrical surface that surrounds the valve chamber 51*g* in cooperation with the valve chamber peripheral wall surface 512 about the valve axis AXv to form the valve chamber 51*g*. The spring installation surface 514 is placed on the restriction passage 51*h* side of the valve chamber peripheral wall surface 512 in the valve axial direction DRax, and an inner diameter of the spring installation surface 514 is smaller than an inner diameter of the valve chamber peripheral wall surface 512.

As shown in FIG. 23, the number of the extending portions 605 of the damper spring 60 is four, and the extending portions 605 extend inwardly from the fixing portion 604 in the radial direction DRr of the valve axis AXv. FIG. 23 is a view of the damper spring 60 alone viewed from the restriction passage 51*h* side along the valve axis AXv according to the present embodiment.

As shown in FIG. 22, the damper spring 60 contacts the ball valve portion 522 of the valve piece 521 through distal end parts of the extending portions 605 to urge the valve piece 521 toward the valve opening side in the valve axial direction DRax at the valve closing time and in the minute opening degree range of the restriction passage 51*h*. In other words, each of the distal end parts 605*a* of the damper spring 60 contacts a corresponding surface portion of an entire surface of the ball valve portion 522, in which a valve axial direction DRax component of a normal vector is directed toward the restriction passage 51*h*. Thereby, the damper spring 60 urges the valve piece 521 toward the valve opening side in the valve axial direction DRax.

Figure 24:
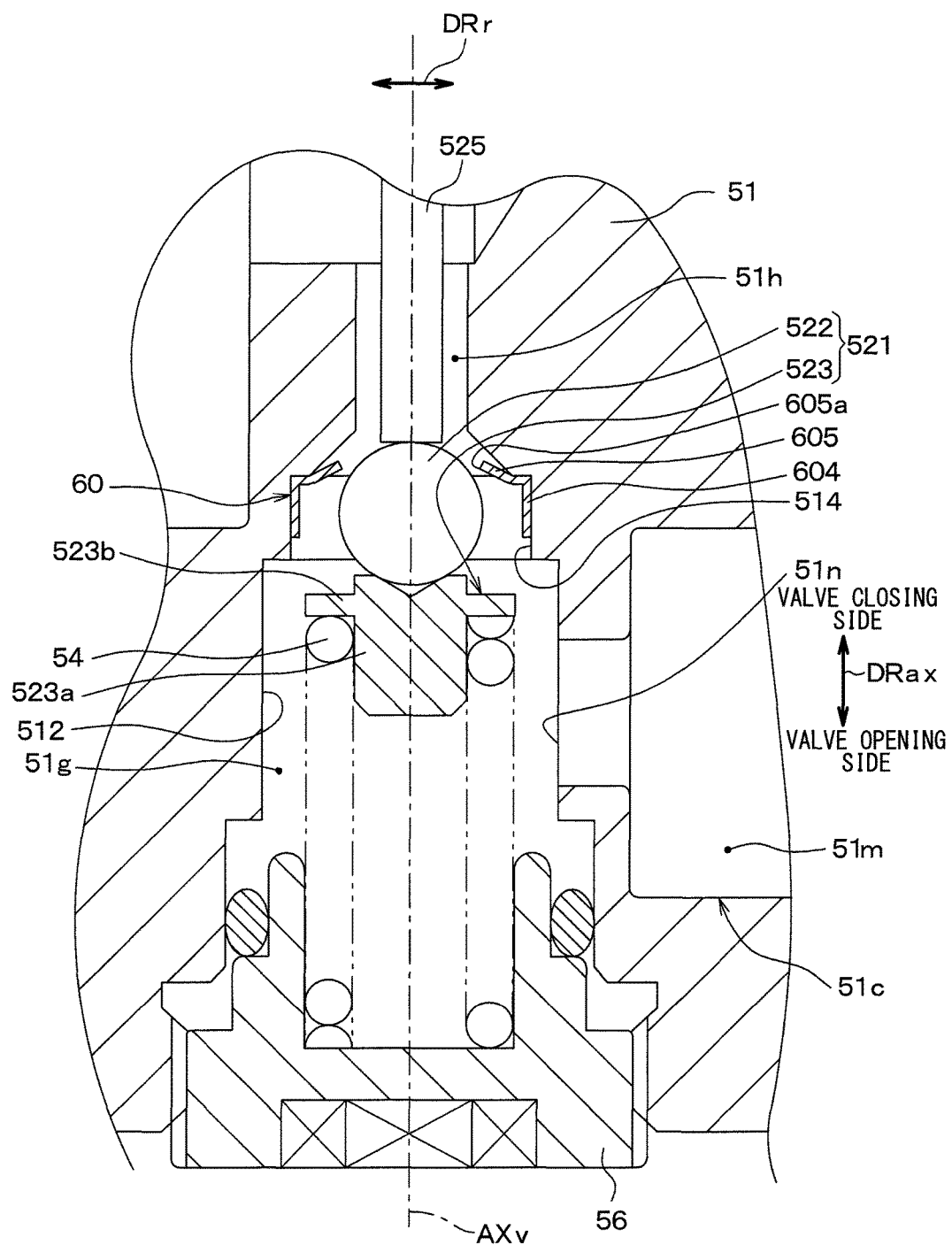
FIG. 24 is a cross-sectional view that corresponds to FIG. 12 of the second embodiment, showing the same portion as that of FIG. 22 according to the fifth embodiment, and indicating a state where the valve piece is moved beyond a predetermined displacement position toward the valve opening side.

With the above construction, for example, as shown in FIG. 24, when the valve piece 521 is moved beyond the predetermined displacement position toward the valve opening side, the damper spring 60 is spaced away from the valve piece 521. Thereby, the urging force Fp of the damper spring 60, which urges the body 51, is released. Since the damper spring 60 is fixed to the body 51 through the fixing portion 604, the urging force Fp of the damper spring 60 is a force that is exerted from the fixing portion 604 of the damper spring 60 to the body 51. FIG. 24 is a cross-sectional view that corresponds to FIG. 12 of the second embodiment. That is, FIG. 24 is a cross-sectional view that shows the same portion as that of FIG. 22, indicating the state where the valve piece 521 is moved beyond the predetermined displacement position toward the valve opening side.

In the present embodiment, the advantages, which are achieved by the common structure that is common to the second embodiment, can be achieved like in the second embodiment. Furthermore, according to the present embodiment, the damper spring 60 is fixed to the body 51 and generates the urging force Fp against the body 51 through contact of the damper spring 60 to the valve piece 521. When the valve piece 521 is moved beyond the predetermined displacement position toward the valve opening side, the damper spring 60 is spaced away from the valve piece 521. Thereby, the urging force Fp of the damper spring 60 is released. Thus, at the time of assembling the valve piece 521 to the body 51, the damper spring 60 may be preassembled to the body 51 to integrally fix the damper spring 60 and the body 51 together. Therefore, for example, the assembling of the valve piece 521, the coil spring 54 and the adjusting screw 56 is eased, and the number of the assembling steps of the thermal expansion valve 5 can be reduced.

Other Embodiments (1) In the first embodiment, the tapered form of the spring contact surface 511 is configured such that the diameter of the spring contact surface 511 progressively increases toward the side away from the restriction passage 51*h* in the valve axial direction DRax. However, this configuration of the tapered form of the spring contact surface 511 is only one example. For example, alternatively, the tapered form of the spring contact surface 511 may be configured such that the diameter of the spring contact surface 511 progressively decreases toward the side away from the restriction passage 51*h* in the valve axial direction DRax.

(2) In each of the above embodiments, the valve chamber peripheral wall surface 512 is, for example, in the form of the inner surface of the cylinder. However, the shape of the valve chamber peripheral wall surface 512 should not be limited to this form. For example, the valve chamber peripheral wall surface 512 may be configured such that the diameter of the valve chamber peripheral wall surface 512 changes according to a location of the valve chamber peripheral wall surface 512 in the valve axial direction DRax. Alternatively, the valve chamber peripheral wall surface 512 may be configured such that a cross section of the valve chamber peripheral wall surface 512, which is perpendicular to the valve axis AXv, is in a rectangular form.

(3) In the second embodiment, the extending portions 602 of the damper spring 60 extend obliquely and radially from the clampable portion 601 about the valve axis AXv. However, this configuration is only one example. The extending portions 602 do not need to extend obliquely. For example, the extending portions 602 may extend along a plane that is perpendicular to the valve axis AXv along the clampable portion 601.

Figure 25:
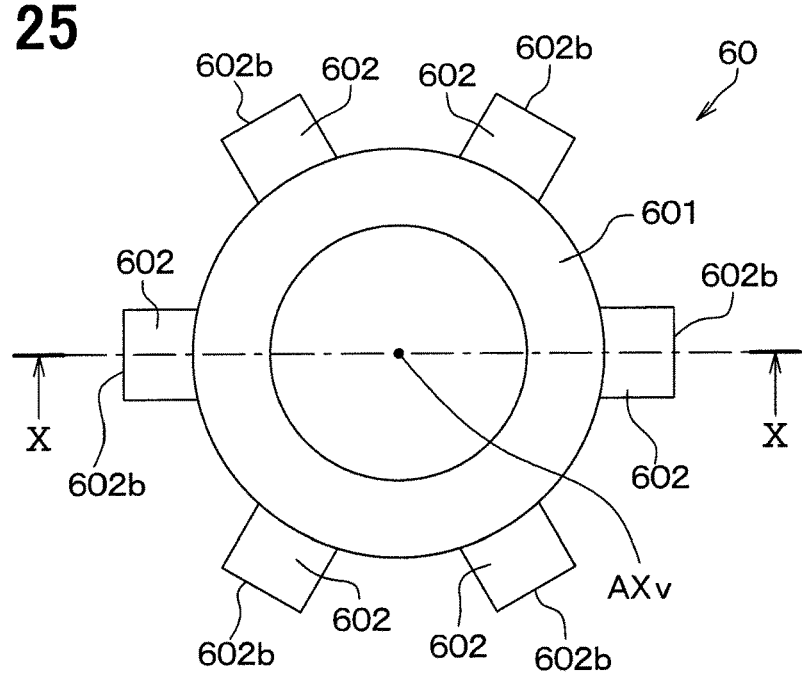
FIG. 25 is a view of a damper spring alone viewed from the restriction passage side along a valve axis in a first modification of the second embodiment, corresponding to FIG. 9.

(4) In the second embodiment, the number of the extending portions 602 of the damper spring 60 is four. However, the number of the extending portions 602 should not be limited to any particular number. For example, as shown in FIG. 25, the number of the extending portions 602 may be six. FIG. 25 is a diagram showing a first modification of the second embodiment and corresponding to FIG. 9. A cross sectional view taken along line X-X in FIG. 25 is the same as that of FIG. 10.

Figure 26:
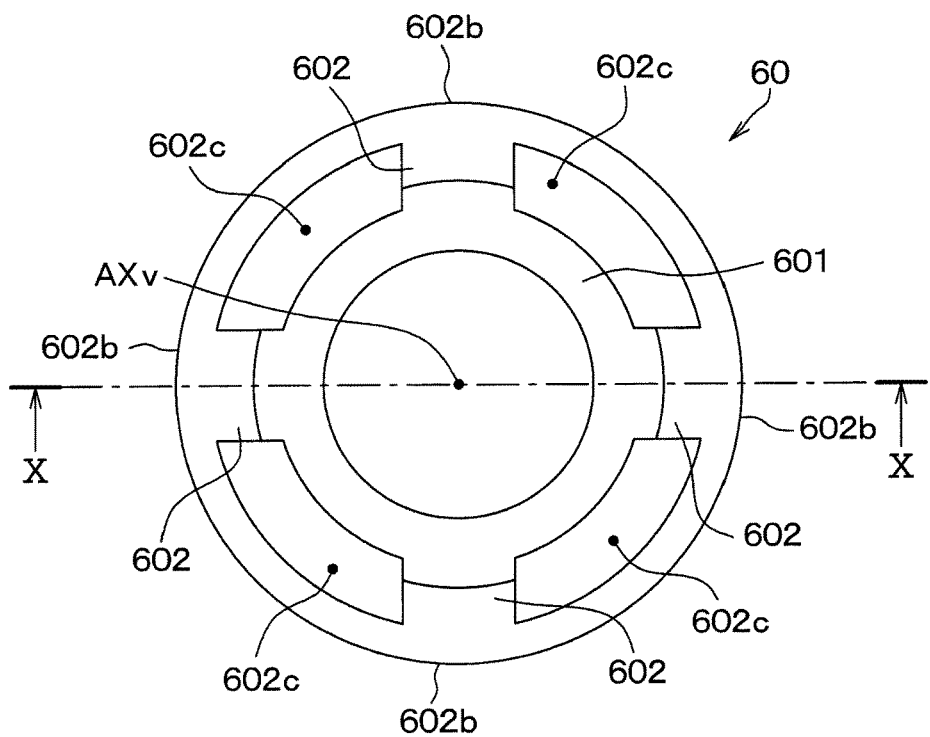
FIG. 26 is a view of a damper spring alone viewed from the restriction passage side along a valve axis in a second modification of the second embodiment, corresponding to FIG. 9.

(5) In the damper spring 60 of the second embodiment, the extending portions 602 are connected relative to each other through the clampable portion 601 at base end parts of the extending portions 602. In addition to this configuration, the extending portions 602 may be connected relative to each other through the clampable portion 601 at distal end parts of the extending portions 602, as shown in FIG. 26. FIG. 26 is a diagram showing a second modification of the second embodiment and corresponding to FIG. 9. A cross sectional view taken along line X-X in FIG. 26 is the same as that of FIG. 10. In the damper spring 60 shown in FIG. 26, a through-hole 602c is formed between each adjacent two of the extending portions 602 in a circumferential direction about the valve axis AXv. When the damper spring 60 contacts the spring contact surface 511, the refrigerant flows into the restriction passage 51h through the through-holes 602c.

Figure 27:
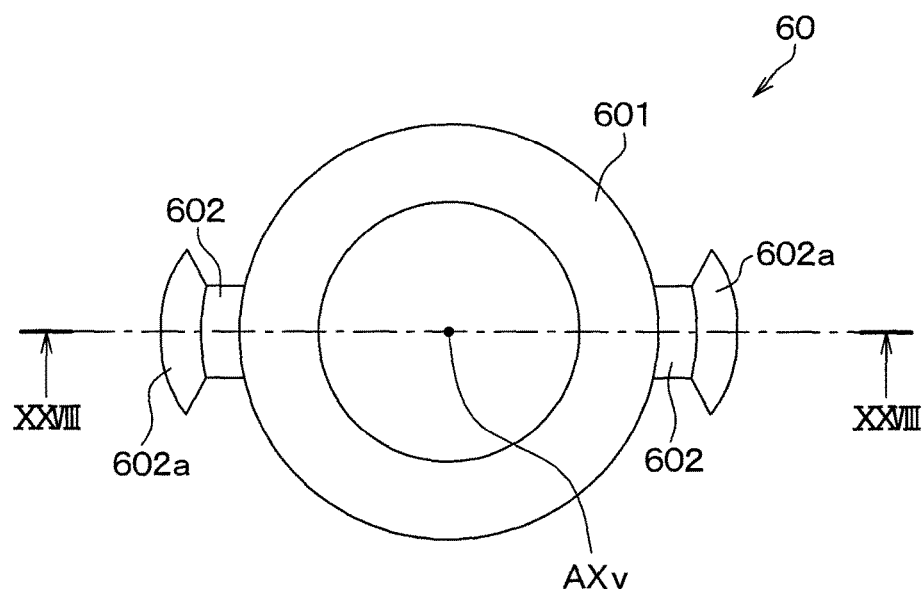
FIG. 27 is a view of a damper spring alone viewed from the restriction passage side along a valve axis in a third modification of the second embodiment, corresponding to FIG. 9.
Figure 28:
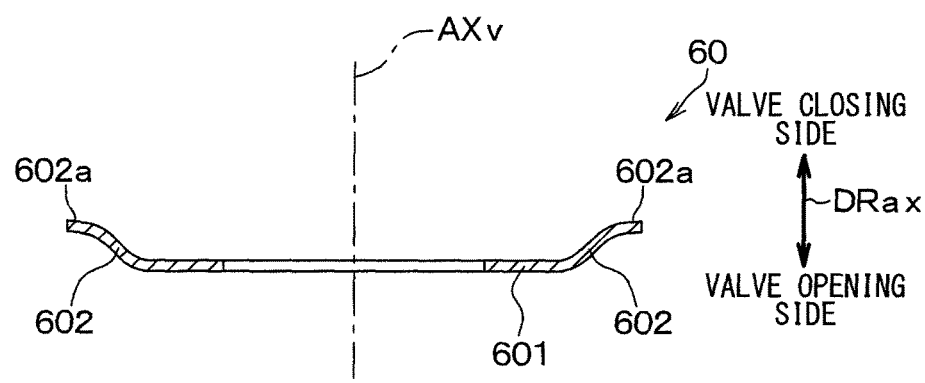
FIG. 28 is a cross-sectional view taken along line XXVIII-XXVIII in FIG. 27.

(6) In the damper spring 60 of the second embodiment, the extending portions 602 contact the spring contact surface 511 of the body 51 through the distal end edges 602b of the extending portions 602. However, this configuration is only one example. For example, as shown in FIGS. 27 and 28, each of the extending portions 602 may have a distal end surface 602a like in the first embodiment and may make surface-to-surface contact with the spring contact surface 511 through the distal end surface 602a. FIG. 27 is a diagram showing a third modification of the second embodiment and corresponding to FIG. 9. Furthermore, FIG. 28 is a cross-sectional view taken along line XXVIII-XXVIII in FIG. 27. In the damper spring 60 shown in FIGS. 27 and 28, the number of the extending portions 602 is two.

(7) In each of the above embodiments, the ball valve portion 522 of the valve piece 521 is shaped into the spherical form. However, the shape of the valve piece 521 should not be limited to any particular form. For example, a valve piece surface of the valve piece 521, which contacts the valve seat of the body 51, may be in a form of a conical surface.

(8) In each of the above embodiments, the thermal expansion valve 5 is the pressure reduction valve that reduces the pressure of the refrigerant, which serves as the pressure fluid. However, the pressure fluid, which is depressurized, should not be limited to the refrigerant and may be any one of liquid or gas. Therefore, the system, in which the pressure reduction valve of the present disclosure is used, may be other than the air conditioning system.

The present disclosure should not be limited to any of the above embodiments. Various other modifications and equivalent modifications should be included in the scope of the present disclosure. Further, needless to say, in the respective embodiments, constituent elements of the embodiments are not always essential unless the constituent elements are clearly specified to be particularly essential, or unless the constituent elements are obviously considered essential on a theoretical basis. In addition, in the respective embodiments, when the number including count, figure, amount and range, etc. of the constituent elements of the embodiments is mentioned, the number of constituent elements should not be limited to a specific number unless the number is clearly specified to be particularly essential, or unless the number is definitely limited to the specific number in principle. Further, when materials, shapes and positional relationships, etc. of the constituent elements, etc. are mentioned in the respective embodiments, the materials, the shapes and the positional relationships, etc. should not be limited to specific materials, shapes or positional relationships, etc. unless the materials, the shapes and the positional relationships are clearly specified to be particularly essential, or unless the materials, the shapes and the positional relationships are definitely limited to the specific materials, shapes and positional relationships, etc. in principle.

What is claimed is:

1. A pressure reduction valve comprising:
    a valve main body that has a restriction passage, which conducts pressure fluid and restricts a flow of the pressure fluid;
    a valve piece that is displaceable in an axial direction of an axis to increase or decrease an opening degree of the restriction passage;
    a valve piece urging member that urges the valve piece toward a valve closing side, at which the opening degree of the restriction passage is reduced by the valve piece;
    an actuation member that exerts a drive force against the valve piece in a direction of moving the valve piece toward a valve opening side, at which the opening degree of the restriction passage is increased by the valve piece; and
    a vibration limiting member that limits vibration of the valve piece in a direction, which intersects with the axial direction, in a state where the vibration limiting member contacts a contact portion of the valve main body and is urged together with the valve piece in the axial direction toward the valve closing side by the valve piece urging member to exert an urging force of the vibration limiting member against the contact portion of the valve main body toward the valve closing side, wherein:
    when the valve piece is moved by the actuation member beyond a predetermined displacement position toward the valve opening side during normal operation of the pressure reduction valve, the valve piece releases the urging force of the vibration limiting member by disengaging the vibration limiting member away from the contact portion of the valve main body.

2. The pressure reduction valve according to claim 1, wherein:
the vibration limiting member is fixed to the valve piece and generates the urging force when the vibration limiting member contacts the valve main body; and
when the valve piece is moved beyond the predetermined displacement position toward the valve opening side, the vibration limiting member is spaced away from the valve main body to release the urging force.

3. The pressure reduction valve according to claim 2, wherein:
the valve main body has a valve chamber that is communicated with the restriction passage and is formed on an upstream side of the restriction passage while the valve chamber receives the valve piece and the vibration limiting member;
the valve main body includes:
the contact portion that is exposed in an inside of the valve chamber while the vibration limiting member is contactable with the contact portion; and
a valve chamber peripheral wall surface that is placed on an opposite side of the contact portion, which is opposite from the restriction passage in the axial direction, while the valve chamber peripheral wall surface surrounds the valve chamber around the axis; and
even when the valve piece is moved to any position, an outer diameter of the vibration limiting member is smaller than an inner diameter of the valve chamber peripheral wall surface, and the vibration limiting member is spaced from the valve chamber peripheral wall surface.

4. The pressure reduction valve according to claim 3, wherein:
the valve main body includes a contact surface, against which the vibration limiting member is contactable, as the contact portion;
the contact surface is shaped into a tapered form that circumferentially extends about the axis;
the vibration limiting member includes a limiting member side contact surface that is contactable with the contact surface of the valve main body;
when the limiting member side contact surface contacts the contact surface of the valve main body in response to movement of the valve piece, contact between the limiting member side contact surface and the contact surface of the valve main body begins from a radially outer part of the limiting member side contact surface, which is located at a radially outer side in a radial direction of the axis; and
after start of the contact between the limiting member side contact surface and the contact surface of the valve main body, the vibration limiting member is flexed such that a tilt angle of the limiting member side contact surface relative to the contact surface of the valve main body is progressively reduced when the valve piece is moved toward the valve closing side.

5. The pressure reduction valve according to claim 3, wherein:
the valve main body includes a contact surface, against which the vibration limiting member is contactable, as the contact portion;
the contact surface faces in the axial direction;
the vibration limiting member includes:
a limiting-member side contact part that is contactable with the contact surface of the valve main body; and
a tilted part that is tilted relative to the contact surface and extends from the limiting-member side contact part; and
after occurrence of contact of the limiting-member side contact part to the contact surface of the valve main body in response to movement of the valve piece toward the valve closing side, the vibration limiting member is flexed such that a tilt angle of the tilted part relative to the contact surface of the valve main body is progressively reduced when the valve piece is moved toward the valve closing side.

6. The pressure reduction valve according to claim 3, wherein:
the vibration limiting member includes a tilted part, which is tilted relative to the axis in such a manner that the tilted part is progressively displaced toward the valve opening side in the axial direction from a radially inner side toward a radially outer side of the tilted part in a radial direction of the axis;
the tilted part is contactable with the contact portion of the valve main body through a fraction of the tilted part; and
after occurrence of contact of the tilted part to the contact portion of the valve main body in response to movement of the valve piece toward the valve closing side, the vibration limiting member is flexed such that a tilt angle of the tilted part relative to the axis is progressively reduced when the valve piece is moved toward the valve closing side.

7. The pressure reduction valve according to claim 3, wherein:
the valve piece includes a ring surface that faces an opposite side, which is opposite from the restriction passage in the axial direction, while the ring surface is shaped into a ring form that extends around the axis;
the valve piece urging member is a coil spring that urges the ring surface toward the restriction passage in the axial direction; and
the vibration limiting member includes a clampable portion, which is clamped between the ring surface and the coil spring, and an extending portion, which extends from the clampable portion, while the vibration limiting member contacts the contact portion of the valve main body through a fraction of the extending portion.

8. The pressure reduction valve according to claim 1, wherein the urging force of the vibration limiting member includes a force component, which is directed in the axial direction.

9. The pressure reduction valve according to claim 1, wherein the vibration limiting member includes a plurality of extending portions that are configured to contact the contact portion of the valve main body, and each of the plurality of extending portions extends away from a base portion of the vibration limiting member toward the actuation member.

* * * * *